United States Patent
Thunga et al.

(10) Patent No.: US 9,340,425 B2
(45) Date of Patent: May 17, 2016

(54) PROCESS OF MAKING CARBON FIBERS FROM COMPOSITIONS INCLUDING ESTERIFIED LIGNIN AND POLY(LACTIC ACID)

(71) Applicant: Iowa State University Research Foundation, Inc., Ames, IA (US)

(72) Inventors: Mahendra Thunga, Des Moines, IA (US); Keke Chen, Ames, IA (US); Michael Richard Kessler, Pullman, WA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 291 days.

(21) Appl. No.: 14/048,532

(22) Filed: Oct. 8, 2013

(65) Prior Publication Data
US 2014/0099505 A1 Apr. 10, 2014

Related U.S. Application Data

(60) Provisional application No. 61/711,584, filed on Oct. 9, 2012.

(51) Int. Cl.
| | |
|---|---|
| *D01F 2/00* | (2006.01) |
| *D01F 2/24* | (2006.01) |
| *C01B 31/00* | (2006.01) |
| *C08L 97/00* | (2006.01) |
| *C01B 31/02* | (2006.01) |
| *C08L 67/04* | (2006.01) |
| *D01F 6/62* | (2006.01) |
| *D01F 9/17* | (2006.01) |
| *D01F 6/92* | (2006.01) |
| *D01F 9/00* | (2006.01) |
| *D01F 9/26* | (2006.01) |
| *C08H 7/00* | (2011.01) |

(52) U.S. Cl.
CPC ............... *C01B 31/00* (2013.01); *C01B 31/02* (2013.01); *C08H 6/00* (2013.01); *C08L 67/04* (2013.01); *C08L 97/005* (2013.01); *D01F 6/625* (2013.01); *D01F 6/92* (2013.01); *D01F 9/00* (2013.01); *D01F 9/17* (2013.01); *D01F 9/26* (2013.01); *Y10T 428/298* (2015.01); *Y10T 428/2929* (2015.01)

(58) Field of Classification Search
CPC .......... C01B 31/00; C01B 31/02; C08H 6/00; C08L 67/04; C08L 97/005; D01F 2/00; D01F 2/24; D01F 6/625; D01F 9/17; D01F 9/26
USPC ................ 264/29.2, 29.6, 29.7, 42, 211.11, 264/211.12; 423/447.1, 447.4, 447.7, 423/447.8; 527/400; 530/500
See application file for complete search history.

(56) References Cited

U.S. PATENT DOCUMENTS

| | | |
|---|---|---|
| 5,344,921 A | 9/1994 | Sudo et al. |
| 7,794,824 B2 | 9/2010 | Eckert et al. |
| 2010/0035775 A1 | 2/2010 | Viswanathan |
| 2010/0249390 A1 | 9/2010 | Azuma et al. |
| 2010/0288456 A1 | 11/2010 | Westland et al. |
| 2012/0003471 A1 | 1/2012 | Bissett et al. |
| 2012/0034512 A1* | 2/2012 | Zhang ............. B32B 5/26 264/29.2 X |
| 2012/0071591 A1 | 3/2012 | Mohanty et al. |

OTHER PUBLICATIONS

Flynn, Susan Keen, "Putting a Spin on Bio Composites", Composites Manufacturing, (Sep.-Oct. 2012), 16.
Garcia-Perez, M., et al., "Co-pyrolysis of sugarcan bagasse with petroleum residue. Part I: thermogravimetric analysis", Fuel, 80, (2001), 1245-1258.
He, Y., et al., "Morphology and Melt Crystallization of Poly(L-lactide) Obtained by Ring Opening Polymerization of L-lactide With Zinc Catalyst", Polymer Engineering & Science, 46(11), (2006), 1583-1589.
Johnson, D. J., et al., "The Fine Structure of Lignin-Based Carbon Fibres", Carbon, 13(4), (1975), 321-325.
Kubo, S., et al., "Kraft Lignin/Poly(ethylene oxide) Blends: Effect of Lignin Structure on Miscibility and Hydrogen Bonding", Journal of Applied Polymer Science, 98(3), (2005), 1437-1444.
Kubo, S., et al., "Lignin-based Carbon Fibers: Effect of Synthetic Polymer Blending on Fiber Properties", Journal of Polymers and the Environment, 13(2), (2005), 97-105.
Miyata, T., et al., "Crystallization behaviour of poly(L-lactide)", Polymer, 39(22), (1998), 5515-5521.
Mousavioun, P., et al., "Chemical and thermal properties of fractionated bagasse soda lignin", Industrial Crops and Products, 31, (2009), 52-58.
Thielemans, W., et al., "Butyrated kraft lignin as compatibilizing agent for natural fiber reinforced thermoset composites", Composites Part A, 35(3), (2004), 327-338.
Thielemans, Wim, et al., "Lignin Esters for Use in Unsaturated Thermosets: Lignin Modification and Solubility Modeling", Biomacromolecules, 6, (2005), 1895-1905.
Tomizuka, I., et al., "Microvoids in Pitch-based and Lignin-based Carbon Fibres as Observed by X-ray Small-angle Scattering", Journal of the Ceramic Society of Japan, 86(992):, (1978), 186-192.
Tomizuka, I., et al., "Voids in the Carbon Fibers Produced from Lignin and PVA", Yogyo-Kyokai-Shi, 79(12), (1971), 460-469.

* cited by examiner

*Primary Examiner* — Leo B Tentoni
(74) *Attorney, Agent, or Firm* — Schwegman Lundberg & Woessner, P.A.

(57) ABSTRACT

The present invention relates to compositions comprising esterified lignin and poly(lactic acid). In various embodiments, the present invention provides fibers comprising the esterified lignin and poly(lactic acid) blend, carbon fibers made therefrom, and methods of making the fiber and the carbon fibers.

20 Claims, 18 Drawing Sheets

PROCESS OF MAKING CARBON FIBERS FROM COMPOSITIONS INCLUDING ESTERIFIED LIGNIN AND POLY(LACTIC ACID)

CROSS-REFERENCE TO RELATED APPLICATION

This application claims the benefit of priority to U.S. Provisional Patent Application Ser. No. 61/711,584 entitled "COMPOSITIONS INCLUDING ESTERIFIED LIGNIN AND POLY(LACTIC ACID) AND CARBON FIBERS PRODUCED THEREFROM," filed Oct. 9, 2012, the disclosure of which is incorporated herein in its entirety by reference.

BACKGROUND OF THE INVENTION

Carbon fibers have high stiffness, high tensile strength, low weight, high chemical resistance, high temperature tolerance, and low thermal expansion, properties which makes them valuable in industries including aerospace, civil engineering, military, motorsports, and competition sports. Applications include reinforcement of composition materials such as reinforcement of polymers, filtration, metal matrix composites, carbon fiber-reinforced carbon, electrodes, and anti-static components. An example includes carbon fiber reinforced polymer resins used to make wind turbine blades.

Carbon fibers are generally made by heating raw fibers made from polyacrylonitrile (PAN) or pitch to high temperatures. However, these procedures are expensive and have associated environmental issues. Glass fibers are less expensive, but have higher densities and lower fatigue ratios, making them less effective than carbon fibers for a variety of applications.

SUMMARY OF THE INVENTION

In various embodiments, the present invention provides a composition including lignin. The lignin includes at least one esterified —OH group. The esterified —OH group on the lignin has the structure —OC(O)R, wherein each R is independently a $C_1$-$C_{30}$ hydrocarbyl group. The composition also includes poly(lactic acid). In various embodiments, the present invention provides fibers including the composition including the esterified lignin and poly(lactic acid). In some embodiments, the present invention provides carbon fibers made from the fibers of the esterified lignin and poly(lactic acid) blend.

In various embodiments, the present invention provides a method of making spun fibers. The method also includes spinning fibers from a composition including esterified lignin and poly(lactic acid). The esterified lignin includes at least one esterified —OH group. The esterified —OH group on the lignin has the structure —OC(O)R, wherein each R is independently a $C_1$-$C_{30}$ hydrocarbyl group. In various embodiments, the present invention provides a method of making carbon fibers. The method includes heating the spun fibers of the esterified lignin and poly(lactic acid) blend so as to provide carbon fibers.

In various embodiments, the present invention provides a carbon fiber. The carbon fiber includes a surface area of about 300-700 $m^2$/g. The carbon fiber includes an average pore volume of about 0.100-0.500 $cm^3$/g.

Various embodiments of the present invention have certain advantages over other compositions and methods, some of which are unexpected. In some examples, the esterified lignin and poly(lactic acid) composition has superior miscibility, due at least to the modification of the polarity of the lignin via the esterification. In some embodiments, the esterified lignin and poly(lactic acid) composition can be spun into fibers more easily, at a lower cost, and more effectively than other lignin and polymer compositions. In some examples, unexpectedly, the esterified lignin and poly(lactic acid) composition forms microphase separation which can impart useful mechanical properties and allow formation of carbon fibers having unique and valuable properties. In various embodiments, the microphase separation of the esterified lignin and poly(lactic acid) composition in the fibers advantageously allows formation of voids or pores in carbon fibers derived therefrom.

In some examples, the esterified lignin and poly(lactic acid) composition can advantageously form carbon fibers having a plurality of smaller carbon fibers therein. In some examples, the esterified lignin and poly(lactic acid) composition can form fibers that are more effective for making carbon fibers than other lignin/polymer blends. In some embodiments, the carbon fibers of the present invention have superior properties over other carbon fibers, such as superior porosity, and such as superior distribution of pores.

In various embodiments, the carbon fibers of the present invention provide superior filtration applications, due at least to the porosity of the fibers. In various embodiments, the pores of the carbon fibers can be filled with other materials, allowing advantageous new uses of the carbon fibers. In some embodiments, the carbon fibers of the present invention are lighter than other carbon fibers, due to their porosity.

In some embodiments, the method of making carbon fibers of the present invention allows production of carbon fibers at a lower cost and with a lower impact on the environment than other methods of making carbon fibers, such as methods including heating pitch or PAN. In various embodiments, the method of making carbon fibers of the present invention allows production of carbon fibers with less cost than the cost of generating glass fibers, advantageously allowing the carbon fibers of the present invention to replace or supplement glass fibers in a variety of applications, for example, in polymer-fiber composites used to make wind turbine blades.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
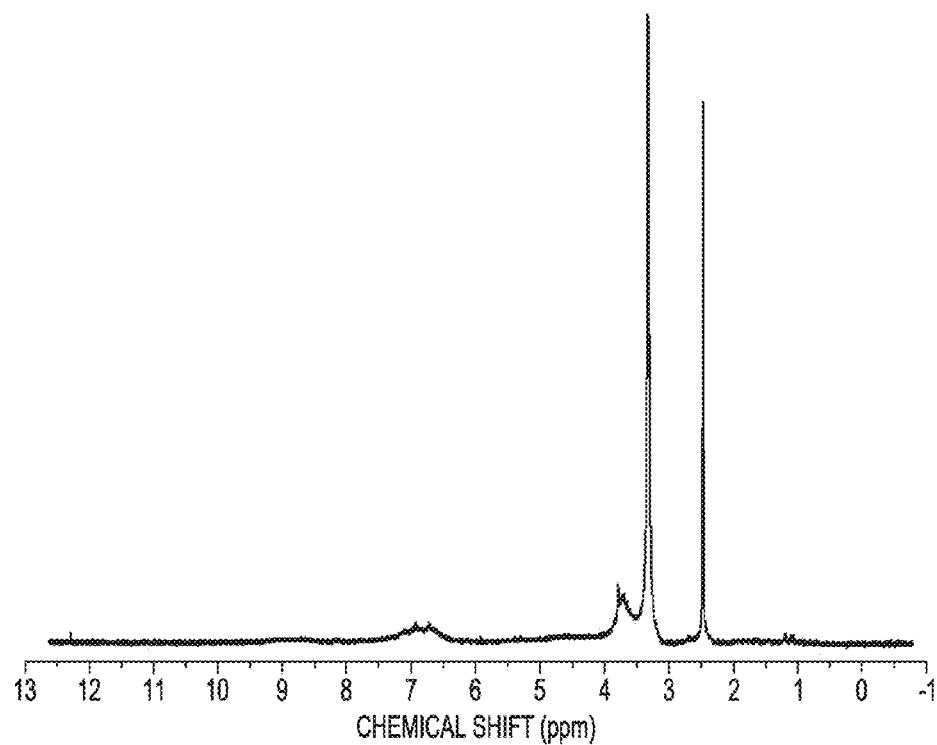
FIG. 1a illustrates an $^1$H-NMR spectrum of softwood kraft lignin before butyration, in accordance with various embodiments of the present invention.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DEFINITIONS

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR', OC(O)N(R')$_2$, CN, CF$_3$, OCF$_3$, R', C(O), methylenedioxy, ethylenedioxy, N(R')$_2$, SW, SOW, SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen (in examples that include other carbon atoms) or a carbon-based moiety, and wherein the carbon-based moiety can itself be further substituted; for example, wherein R' can be hydrogen (in examples that include other carbon atoms), alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl, or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J. Examples of organic groups include linear and/or branched groups such as alkyl groups, fully or partially halogen-substituted haloalkyl groups, alkenyl groups, alkynyl groups, aromatic groups, acrylate functional groups, and methacrylate functional groups; and other organic functional groups such as ether groups, cyanate ester groups, ester groups, carboxylate salt groups, and masked isocyano groups. Examples of organic groups include, but are not limited to, alkyl groups such as methyl, ethyl, propyl, isopropyl, n-butyl, s-butyl, and t-butyl groups, acrylate functional groups such as acryloyloxypropyl groups and methacryloyloxypropyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy (polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as actetoxyethyl and benzoyloxypropyl groups; hydroxy functional groups such as 2-hydroxyethyl groups; masked isocyanate functional groups such as propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; and metal salts of carboxylic acids such as the zinc, sodium, or potassium salts of 3-carboxypropyl and 2-carboxyethyl.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O) R', (CH$_2$)$_{0-2}$N(R')N(R')$_2$, N(R')N(R')C(O)R', N(R')N(R')C (O)OR', N(R')N(R')CON(R')$_2$, N(R')SO$_2$R', N(R')SO$_2$ N(R')$_2$, N(R')C(O)OR', N(R')C(O)R', N(R')C(S)R', N(R')C (O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "pore" as used herein refers to a depression, slit, or hole of any size or shape in a solid object. A pore can run all the way through an object or partially through the object. A pore can intersect other pores.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature between about 15° C. and about 28° C.

As used herein, "carbon fiber" refers to a fiber including at least 90 wt. % carbon.

Composition including Esterified Lignin and Poly(Lactic Acid).

In various embodiments, the present invention provides a composition including poly(lactic acid) and lignin including at least one esterified —OH group. The esterified —OH group has the structure —OC(O)R, wherein each R is independently a C$_1$-C$_{30}$ hydrocarbyl group. In some embodiments, the ester groups of an esterified lignin molecule are not each the same ester group. In other embodiments, the ester groups of an esterified lignin molecule are the same. The C$_1$-C$_{30}$ hydrocarbyl group can be any suitable hydrocarbyl group. For example, the C$_1$-C$_{30}$ hydrocarbyl group can be at least one of an alkyl, alkenyl, alkynyl, acyl, aryl, and a cycloalkyl group. The C$_1$-C$_{30}$ hydrocarbyl group can be substituted or unsubstituted. A substituted C$_1$-C$_{30}$ hydrocarbyl group can be substituted with any suitable functional group, such as any organic group or such as any halogen. In some examples, the hydrocarbyl group is a C$_1$-C$_{20}$ hydrocarbyl group, or a C$_1$-C$_{10}$ hydrocarbyl group. In some embodiments, the hydrocarbyl group is a C$_1$-C$_{10}$ alkyl group, or a C$_1$-C$_6$ alkyl group, such as a methyl, ethyl, propyl, butyl, pentyl, or hexyl group; thus, in various embodiments, the ester can be an ethanoane (e.g., acetate), propanoate, butanoate (e.g., butyrate), pentanoate (e.g., valerate), hexanote (e.g., caproate), or an octanoate (caprylate) ester.

The esterified lignin can be derived from any suitable lignin. The lignin can be derived from a biorenewable resource. In various embodiments, the esterified lignin can be derived from softwood lignin, hardwood lignin, lignin obtained from a sulphite pulping process, lignin obtained from a soda pulping process, lignin obtained from an organosolv process, lignin obtained from a kraft process, and lignin extracted using an ionic liquid. In some embodiments, substantially all of the —OH groups of the esterified lignin are esterified. In other embodiments, less than all of the —OH groups of the esterified lignin are esterified. At least one —OH group of the lignin is esterified. In various embodiments, about 50%, 60%, 70%, 80%, 85%, 90%, 91%, 92%, 93%, 94%, 95%, 96%, 97%, 98%, 99%, 99.5%, 99.9%, 99.99%, or about 99.999% of the —OH groups on the lignin are esterified. In various embodiments, about 40-100%, 50-100%, 60-100%, or about 70-100% of the —OH groups on the lignin are esterified. In some embodiments, about 80-100%, 90-100%, or about 95-100% of the —OH groups on the lignin are esterified.

The poly(lactic acid), also referred to as "polylactide," can be any suitable poly(lactic acid). For example, the poly(lactic acid) can be poly(L-lactic acid), poly(D-lactic acid), poly(D, L-lactic acid), or any combination thereof. Poly(lactic acid) can have any suitable degree of polymerization. For example, the poly(lactic acid) can have a degree of polymerization of about 2-10,000,000, 2-100,000, 2-10,000, or about 5-5500. The poly(lactic acid) can be derived from any suitable source. For example, the poly(lactic acid) can be derived from a renewable resource, such as by bacterial fermentation of biological materials such as corn starch, tapioca products, or sugarcanes.

The composition can have any suitable proportion of esterified lignin and poly(lactic acid). For example, the composition can have a weight ratio of esterified lignin to poly(lactic acid) of about 0.01:1, 0.1:1, 0.2:1, 0.3:1, 0.4:1, 0.5:1, 0.6:1, 0.7:1, 0.8:1, 0.9:1, 1:1, 1.5:1, 2:1, 2.5:1, 3:1, 3.5:1, 4:1, 4.5:1, 5:1, 6:1, 7:1, 8:1, 9:1, 10:1, 20:1, 50:1, 100:1, 200:1, 400:1, 800:1, or about 1000:1 by weight. In some examples, the composition has a weight ratio of esterified lignin to poly(lactic acid) of about 1:1-999:1 by weight, 1.9:1-9:1, or about 3:1 by weight.

Method of Making Fibers of the Composition Including Esterified Lignin and Poly(Lactic Acid).

In various embodiments, the present invention provides a method of making spun fibers using the composition that includes the esterified lignin and the poly(lactic acid). The method includes providing or obtaining the composition including the esterified lignin and the poly(lactic acid). The method includes spinning fibers from the composition, giving spun fibers.

Spinning the fibers from the composition can be performed using any suitable method. Spinning the fibers can include treating the composition such that it is obtained in a flowable state, such as by at least one of melting or dissolving the composition in a solvent, or with chemical treatment. In some examples, spinning the fibers can include extruding the composition through a die or spinneret. After extrusion the fibers can cool or dry to a rubbery or solid state.

The spinning can be wet spinning, wherein the composition is dissolved in a solvent, and wherein the spinneret is submerged in a chemical bath that causes the fiber to precipitate, and then solidify, as it emerges. The spinning can be dry spinning, wherein the composition is dissolved in a solvent, and the solvent is evaporated after extrusion from the spinneret to solidify the fiber. The spinning can be melt spinning, wherein the polymer is melted and forced through the spinneret, after which it cools and becomes solidified. The spinning can include extrusion spinning, wherein the composition is placed in an extruder which heats and melts the composition, then feeds the hot melted composition to a spinning pump and then on to the spinneret. The spinning can be direct spinning, wherein the composition is originally in a liquid state and does not require melting or fluidization steps. The spinning can be gel spinning, also called dry-wet spinning, wherein the composition is in a gel state during formation before being dried and cooled. The spinning can be electrospinning, which uses an electrical charge to draw fine fibers from a liquid. In some examples, spinning the fibers can include continuously spooling the extruded fiber. The method of spinning provided by the present invention can include any suitable combination of spinning techniques.

Properties of the Composition Including Esterified Lignin and Poly(Lactic Acid) and Fibers Derived Therefrom.

The composition including esterified lignin and poly(lactic acid), and fibers spun therefrom, can have any suitable properties, which can depend on, for example, the type of ester group on the lignin, the proportion of —OH groups esterified, the type of lignin, the type of poly(lactic acid), the degree of polymerization of the poly(lactic acid), and the weight ratio of the esterified lignin and the poly(lactic acid).

The composition, including in bulk or spun fibers thereof, can have any suitable glass transition temperature, for example, the temperature at which the composition transitions between a hard and relatively brittle state and a molten or rubber-like state. In some embodiments, the composition or spun fibers thereof can have a glass transition temperature of about 20-100° C., 30-90° C., or about 40-70° C. In some embodiments, the composition or spun fibers thereof can have a glass transition temperature, as determined by differential scanning calorimetry (DSC) of about 20-100° C., 30-75° C., or about 42-59° C. In some examples, the composition or spun fibers thereof can have a glass transition temperature, as determined by dynamic mechanical analysis, of about 20-100° C., 40-80° C., or about 50-70° C.

The composition, including in bulk or spun fibers thereof, can have any suitable melting temperature, for example, the temperature at which the composition or spun fibers thereof transitions between solid and liquid. In some embodiments, the melting temperature of the composition or spun fibers thereof can be 120-200° C., 140-180° C., or about 155-170° C.

The composition, including in bulk or spun fibers thereof, can exhibit any suitable degree of miscibility between the esterified lignin and the poly(lactic acid). The degree of miscibility can have a strong correlation with the type of ester group or groups on the lignin. For example, the esterified lignin and the PLA can be fully miscible, down to the micro-scale. In other examples, the esterified lignin can be immiscible on the micro-scale (e.g., exhibits micro-scale phase separations in the range of 0.1-100 μm), but fully miscible on the macro-scale. In some embodiments, the esterified lignin can be either miscible or immiscible on the nano-scale (e.g. in the range of 0.1-100 nm). In some examples, the esterified lignin can be immiscible on both the micro-scale and the macro-scale.

The tensile storage and loss modulus in viscoelastic solids can measure the stored energy, representing the elastic portion, and the energy dissipated as heat, representing the viscous portion. The tensile storage and loss modulus can be measured, for example, using dynamic mechanical analysis. The composition, including in bulk or spun fibers thereof, can exhibit any suitable storage modulus (E'). In some embodiments, the composition, including in bulk or spun fibers thereof, in a glassy state, can have a storage modulus of about 250 to 2000 MPa, 500 to 1500 MPa, or about 1000-1450 MPa. In some examples, the composition, including in bulk or spun fibers thereof, can have a storage modulus at about 100° C. of about 2-1000 MPa, 10-200 MPa, or about 20-100 MPa. In some examples, the composition, including in bulk or spun fibers thereof, can have a storage modulus at about 25° C. of about 500-1300 MPa, 600-1200 MPa, or about 700-1100 MPa. In some examples, the composition, including in bulk or spun fibers thereof, can have a loss modulus at 100° C. of about 3-40 MPa, 4-20 MPa, or about 5-12 MPa. In some examples, the composition, including in bulk or spun fibers thereof, can have a loss modulus at about 25° C. of about 5-300 MPa, 10-200 MPa, or about 20-100 MPa.

The composition, including in bulk or spun fibers thereof, can exhibit any suitable degradation characteristics. In some examples, the composition, including in bulk or spun fibers thereof, can exhibit an onset temperature of about 1% weight loss of about 160-310° C., 170-250° C., or about 175-220° C. In some examples, the composition, including in bulk or spun fibers thereof, has a maximum thermal decomposition temperature of about 320-500° C., 330-395° C., or about 345-370° C. In various embodiments, the composition, including in bulk or fibers thereof, has a residual carbon at about 800° C., based on the starting weight of the composition, of about 0.1-40 wt. %, 0.4-30 wt. %, or about 10-25 wt. % residual carbon.

Fibers made from the esterified lignin and poly(lactic acid) can have any suitable diameter. In some examples, the fiber can have a diameter of about 100-160, or about 100-145 μm, or about 0.01-300 μm, 0.5-100 μm, 50-100 μm, 20-80 μm, 0.5-20 μm, or about 1-10 μm. The fiber can have any suitable length, for example, about 0.01 mm to about 1 km or more. The fiber can have any suitable tensile modulus, for example, about 100-5000 MPa, 500-4000 MPa, or about 600-3000 MPa, or about 1500-2500 MPa. The fiber can have any suitable morphology, for example, cylindrical morphology.

In some embodiments, the fibers made from the esterified lignin and poly(lactic acid) can have a plurality of smaller fibers embedded within a single larger fiber. Not intending to be limited by any theory of operation, the smaller fibers can be formed by microscale phase separation between the poly (lactic acid) and the esterified lignin. In some examples, the smaller fibers can be substantially poly(lactic acid). In various embodiments, the smaller fibers can each independently have a diameter that is about 1/10 to about 1/1,000,000 the diameter of the larger fiber, or about 1/100 to about 1/10,000 the diameter of the larger fiber. In various examples, each of the plurality of smaller fibers can independent have a diameter of about 2 μm, 1.8, 1.6, 1.4, 1.2, 1.0, 0.8, 0.6, 0.4, 0.2, 0.1, 0.08, 0.06, 0.04, 0.02, 0.01, or about 0.001 μm. The smaller fibers can be aligned within the larger fiber in a direction that is substantially parallel to the length of the fiber.

Method of Making Carbon Fibers.

Various embodiments of the present invention provide a method of making carbon fibers. The method of making carbon fibers can be any suitable method of making carbon fibers from the spun fibers. In some embodiments, the method includes providing or obtaining the composition including the esterified lignin and the poly(lactic acid). The method can include spinning fibers from the composition, giving spun fibers. The method further includes heating the spun fibers, to give carbon fibers.

The method can include a thermostabilization step, which can occur prior to a heating step for carbonization of the fiber. The thermostabilization step can help to prevent the fibers from fusing together during the process of carbonizing the fibers to give carbon fibers. The thermostabilization can include heating the fiber to a temperature slightly above the boiling point of water to remove moisture, with the rate of heating adjusted to a suitable rate. For example, the thermostabilization can include heating the fibers to about 101° C., 105° C., 110° C., 115° C., 120° C., 130° C. or greater. The rate of heating can be about 0.01° C./min, 0.1, 1, 2, 4, 6, 8, or about 10° C./min or more. The thermostabilization can include heating to a higher temperature for an extended time, as a single step or as an additional step to the water removal. The thermostabilization can include heating to about 120° C., 150, 175, 200, 225, 250, 275, 300, 400, or about 500° C. The rate of heating can be about 0.001° C./min, 0.01, 0.1, 1, 2, 4, 6, 8, or about 10° C./min or more. The final temperature can be held for a suitable amount of time, until the thermostabilization is substantially complete. For example, the temperature can be held for 1 min, 2 min, 5 min, 10 min, 30 min, 1 h, 2 h, 4 h, 10 h, 15 h, 20 h or about 30 h. The holding of the temperature can occur in any suitable atmosphere. In various embodiments, the holding of the temperature can occur in an atmosphere that is enriched in nitrogen, such as 5%, 10%, 25%, 50%, 75%, 90%, or 100% nitrogen.

The heating of the spun fibers to obtain carbon fibers can be performed at any suitable rate, at any suitable temperature, such as is suitable to carbonize the fibers. For example, the spun fibers can be heated to a temperature of about 500° C., 750, 1000, 1250, 1500, 1750, 2000, 2250, 2500, 3000, 3250, 3500, 3750, or about 4000° C. or more. The heating can occur at any suitable rate, for example about 1° C./h, 10, 20, 50, 100, 200, 300, 400, 500, 1000, 2000, or about 3000° C./h. The final temperature can be held for a suitable amount of time, until the carbonization is substantially complete. For example, the temperature can be held for 1 min, 2 min, 5 min, 10 min, 30 min, 1 h, 2 h, 4 h, 10 h, 15 h, 20 h or about 30 h. The holding of the temperature can occur in any suitable atmosphere. In various embodiments, the holding of the temperature can occur in an atmosphere that is enriched in oxygen, such as 5%, 10%, 25%, 50%, 75%, 90%, or 100% oxygen.

Properties of Carbon Fibers.

In some embodiments, the structure of the carbon fiber is solid with substantially no pores or voids. In other embodiments, the carbon fiber is porous, or has microvoids.

The carbon fibers of the present invention can have any suitable dimensions. For example, the fibers can have a diameter of about 100-160, or about 100-145 μm, or about 0.01-300 μm, 0.5-100 μm, 50-100 μm, 20-80 μm, 0.5-20 μm, or about 1-10 μm. The fibers can have any suitable length, for example, about 0.01 mm to about 1 km or more.

In carbon fibers including microvoids or pores, the carbon fiber can have an average surface area of about 100-900 $m^2/g$, 300-700 $m^2/g$, 400-600 $m^2/g$, 500-600 $m^2/g$, or about 500-550 $m^2/g$, as measured by BET. The carbon fiber including microvoids or pores can have an average pore volume of about 0.05-0.700 $cm^3/g$, 0.100-0.500 $cm^3/g$, 0.200-0.600 $cm^3/g$, 0.300-0.400 $cm^3/g$, or about 0.300-0.350 $cm^3/g$, as determined using BET. The microvoids can have any suitable shape. For example, the microvoids can be approximately oblong or roughly cylindrical in shape and aligned with the length of the fiber, corresponding to microphase separated poly(lactic acid). By varying the amount of poly(lactic acid) in the composition, and by varying the method of spinning the fibers, the shape and size of the voids in the resulting carbon fibers can be adjusted.

In some examples, a micro-scale phase separated poly (lactic acid) in a fiber can have a crystalline structure. In various embodiments, the presence of crystalline structures of the poly(lactic phase) in the blends can advantageously prevent fiber melting during a thermostabilization stage of carbon fiber manufacture. In some embodiments, blends with high lignin content can give higher carbon yield. Thus, a suitable balance between poly(lactic acid) and esterified lignin content can be made to optimize the manufacturing process and obtain an efficient carbon yield.

EXAMPLES

The present invention can be better understood by reference to the following examples which are offered by way of illustration. The present invention is not limited to the examples given herein.

General

Softwood kraft lignin (Indulin-AT) was provided by Mead-Westvaco Corporation. As received lignin was washed in dilute HCl solution (pH below 5) to remove any dissolved salts. Washed lignin was vacuum dried for several hours to remove moisture and was stored in dry atmosphere. Polylactide (PLA) (NatureWorks LLC, Minn., USA), butyric anhydride (Sigma-Aldrich), 1-methylimidazole (1MIM) (Sigma-Aldrich), cyclohexane (Sigma-Aldrich), diethyl ether (Sigma-Aldrich), deuterated dimethyl sulfoxide (DMSO-$d_6$) (Cambridge Isotope Laboratories, Inc), and potassium bromide (KBr) (Fisher Scientific) were used as received.

NMR. Complete butyration was confirmed by Nuclear Magnetic Resonance ($^1$H NMR) Spectroscopy on a Varian VXR-300 NMR spectrometer. Samples were prepared by dissolving unmodified lignin and B-lignin in DMSO-$d_6$.

IR. Butyration was further confirmed by Fourier transform infrared spectroscopy (FTIR) on a Bruker IFS-66V FT-IR spectrometer. Dried B-lignin and unmodified lignin were milled with KBr to form very fine powder, which then was compressed into a thin pellet to be analyzed.

Thermal Analysis. Thermal analysis of all the blends was performed on a Q50 thermogravimetric analysis (TGA), a Q20 differential scanning calorimetry (DSC) and a Q800 dynamic mechanical analysis (DMA). All instruments are from TA Instruments. TGA results were obtained under nitrogen atmosphere from room temperature (RT) to 1000° C. at a heating rate of 20° C./min, using fiber samples from Example 3 cut into smaller pieces. DSC scans were run from −50° C. to 200° C. at a 20° C./min ramp under nitrogen atmosphere, using fiber samples from Example 3 cut into smaller pieces. DMA measurements were conducted from −50° C. to 150° C. at 3° C./min ramp with 10 mm span 3-point bending clamps, using the blends of Example 2 shaped into rectangular specimens of 24.5 mm×12.5 mm×2 mm prepared by compression molding using a 2-ton hydraulic press made by Wabash.

Characterization of Morphology. Individual fibers were characterized by FEI Quanta 250 Field Emission—Scanning Electron Microscopy (SEM) under at 10.00 kV under high vacuum. Fracture morphology was studied by Transmission Electron Microscopy (TEM) on a 2007 JEOL 2100 200 kV scanning and transmission electron microscope (STEM).

Example 1

Lignin Modification

Kraft softwood lignin and butyric anhydride were added into a two-necked flask at a weight ratio of 1:2 with 1 g of 1-methylimidazole (1MIM) catalyst for every 40 g of lignin. The reaction was carried out under nitrogen atmosphere with vigorous stirring at 50° C. for several hours. After the reaction was completed, diethyl ether was added in a 1:1 volume ratio and the mixture was then washed with deionized water to separate the catalyst 1MIM out of the system. Cyclohexane was then added into ether phase to precipitate the modified lignin. The modified lignin (butyrated lignin, "B-lignin") was vacuum filtered and dried in vacuum oven for 24 h and ground into fine power. The B-lignin was stored in a dry atmosphere and dried again at 60° C. for 12 hours before melt processing.

Figure 1B:
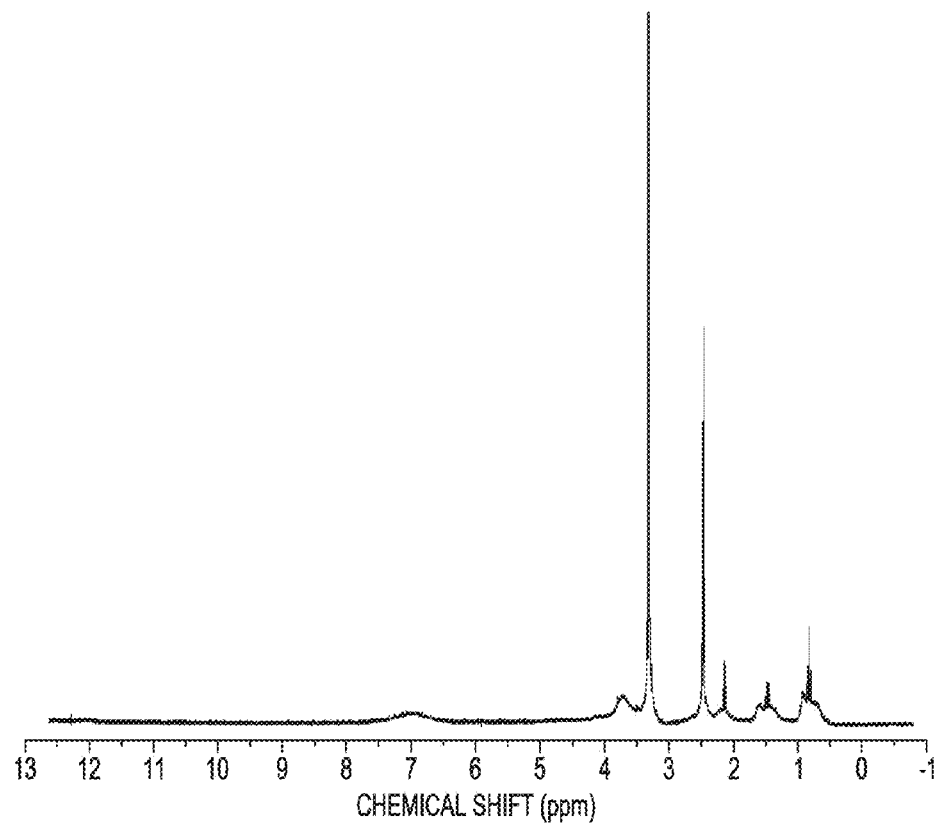
FIG. 1b illustrates an $^1$H-NMR spectrum of softwood kraft lignin after butyration, in accordance with various embodiments of the present invention.
Figure 2A:
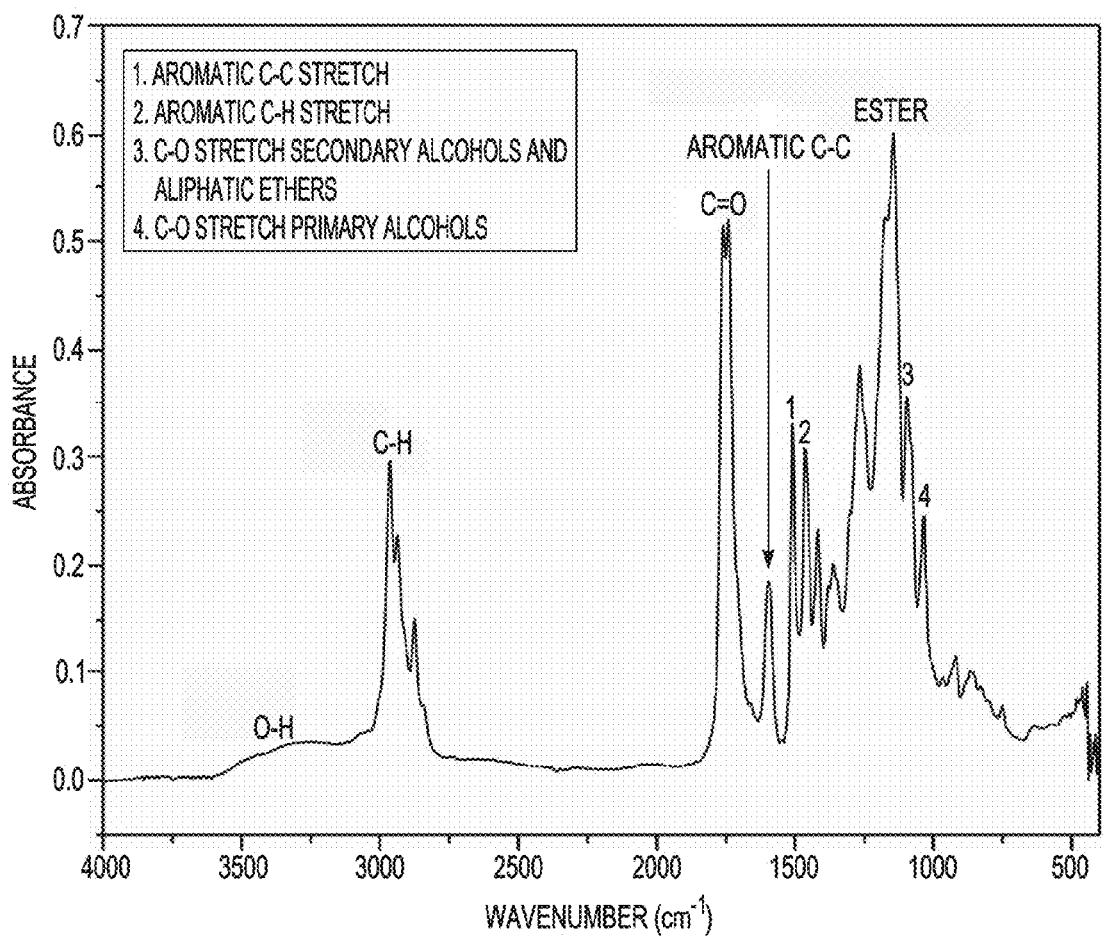
FIG. 2a illustrates an FTIR spectrum of softwood kraft lignin after butyration, in accordance with various embodiments of the present invention.
Figure 2B:
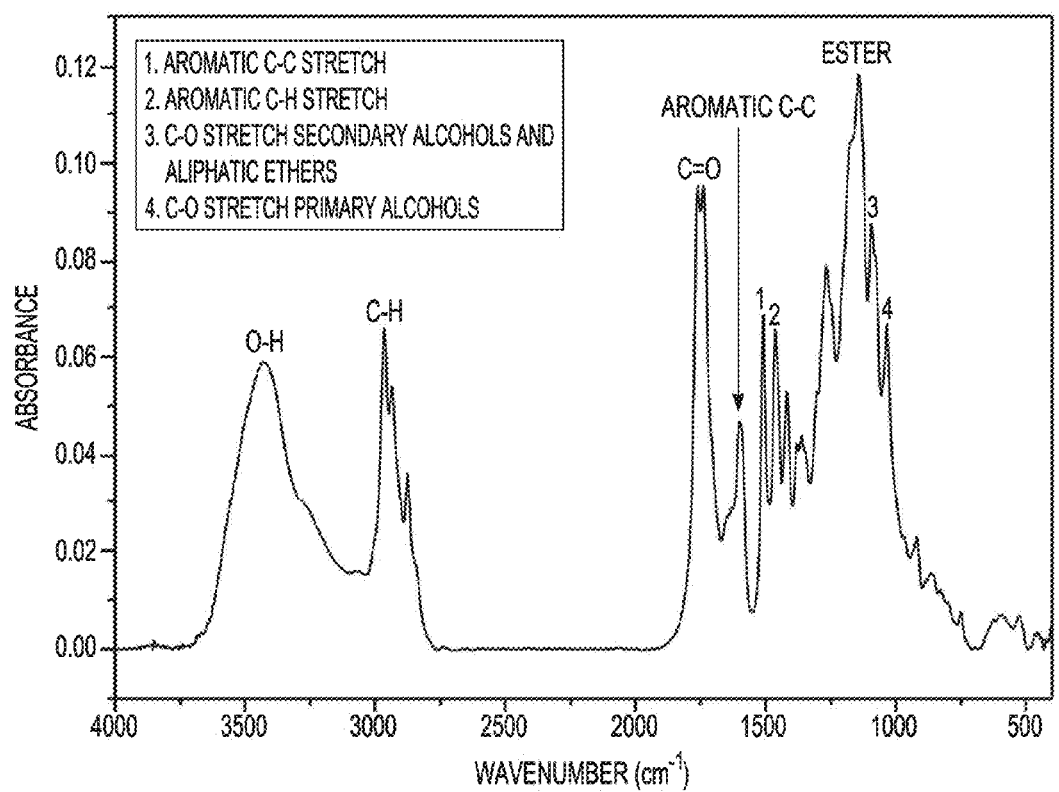
FIG. 2b illustrates an FTIR spectrum of softwood kraft lignin before butyration, in accordance with various embodiments of the present invention.

The formation of butyrate groups on lignin was confirmed by nuclear magnetic resonance ($^1$H NMR) spectroscopy and FTIR spectroscopy. FIGS. 1a and 1b shows the $^1$H NMR spectrum obtained from softwood lignin before (FIG. 1a) and after (FIG. 1b) the butyration reaction. In FIG. 1b, the characteristic peaks appearing between 0.98 and 2.22 ppm for B-lignin correspond to the formation of ester groups upon butyration. FIG. 2a shows the FTIR spectrum of the B-lignin. The alcohol bands (3300-3700, 1097, and 1035 cm$^{-1}$) are smaller in size and the C=O bands (1740 and 1600 cm$^{-1}$) increase, as compared to the unesterified lignin, shown in FIG. 2b. Based on the reaction mechanism (Scheme 1), it is believed that the observed drop in peak intensity is mainly due to the formation of ester groups replacing hydroxyl groups, and that the butyration reaction was completed. Reducing surface hydroxyl groups can significantly reduce the high polarity of lignin; accordingly modified lignin can be completely soluble in low polar organic solvents.

Example 2

Butyrated Lignin/Poly(Lactic Acid) Blend Preparation

B-lignin/PLA blends were formed by melt mixing at 180° C. using a twin screw microcompounder (MC) from DACA Instruments, Calif., USA. The residence time of the melt in barrel was maintained at 5 min to avoid thermal degradation. Blends having weight ratios of B-lignin/PLA of 90/10, 75/25, and 50/50, were prepared.

Example 3

Fiber Preparation from Butyrated Lignin/Poly(Lactic Acid) Blends

Using the blends of Example 2, fine fibers were extruded using a fiber spinning die attached to the end of extruder. Continuous spooling of the extruded fiber from the MC was performed with the help of an advanced DSM-Xplore micro fiber spinning device, Geleen, Netherlands.

Example 4

Differential Scanning Calorimetry

The compatibility of B-lignin and PLA in the blends was investigated based on their glass transition ($T_g$) behavior.

Figure 3:
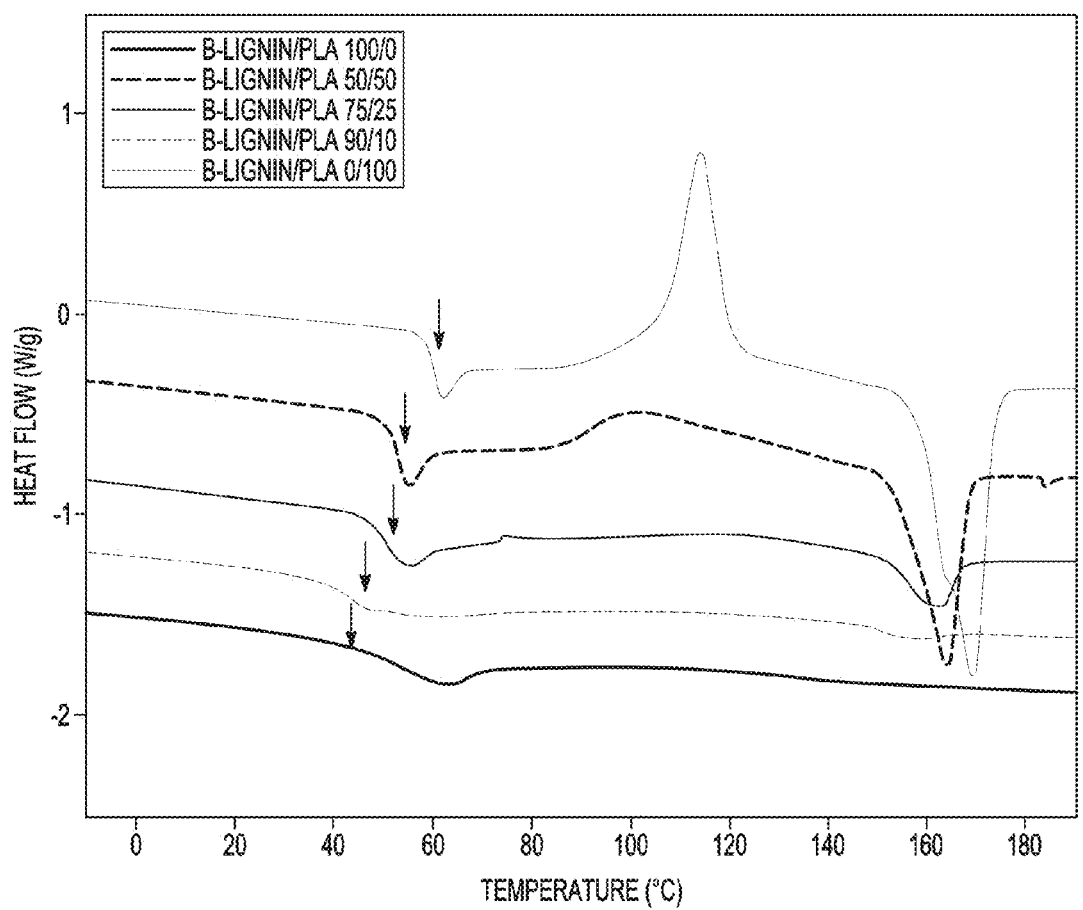
FIG. 3 illustrates differential scanning calorimetry (DSC) curves for various butyrated lignin/poly(lactic acid) blends, in accordance with various embodiments of the present invention.

DSC measurements were taken using the fibers of Example 3, cut into smaller pieces. DSC curves of the blends are compared in FIG. 3. The onset $T_g$ and melting temperature ($T_m$, shown by the right-most downward dip in the curves) of the blends are given in Table 1. As the content of B-lignin in the blend increases, the onset $T_g$ (shown by the arrow toward the left side of the curves, determined by the intersection of the curve with the tangent near $T_g$ having the largest slope) shifts to lower temperatures and the $T_g$ peak becomes broader. This demonstrates evidence of at least molecular level compatibility between PLA phase and B-lignin phase.

TABLE 1

Measured $T_g$ and $T_m$ values of the B-lignin/PLA blends.

| Sample | Onset $T_g$ (° C.) | $T_m$ (° C.) |
|---|---|---|
| B-lignin/PLA 100/0 | 42 | — |
| B-lignin/PLA 90/10 | 42 | 155 |
| B-lignin/PLA 75/25 | 48 | 159 |
| B-lignin/PLA 50/50 | 51 | 164 |
| B-lignin/PLA 0/100 | 59 | 170 |

The $T_m$ of the PLA phase in the blends is depressed with increasing B-lignin content. The size of both the $T_m$ peak and the cold crystallization peak (the peak in-between $T_g$ and $T_m$) decrease with increasing B-lignin content, indicating that the blends exhibit a more amorphous structure with greater B-lignin content.

Figure 4:
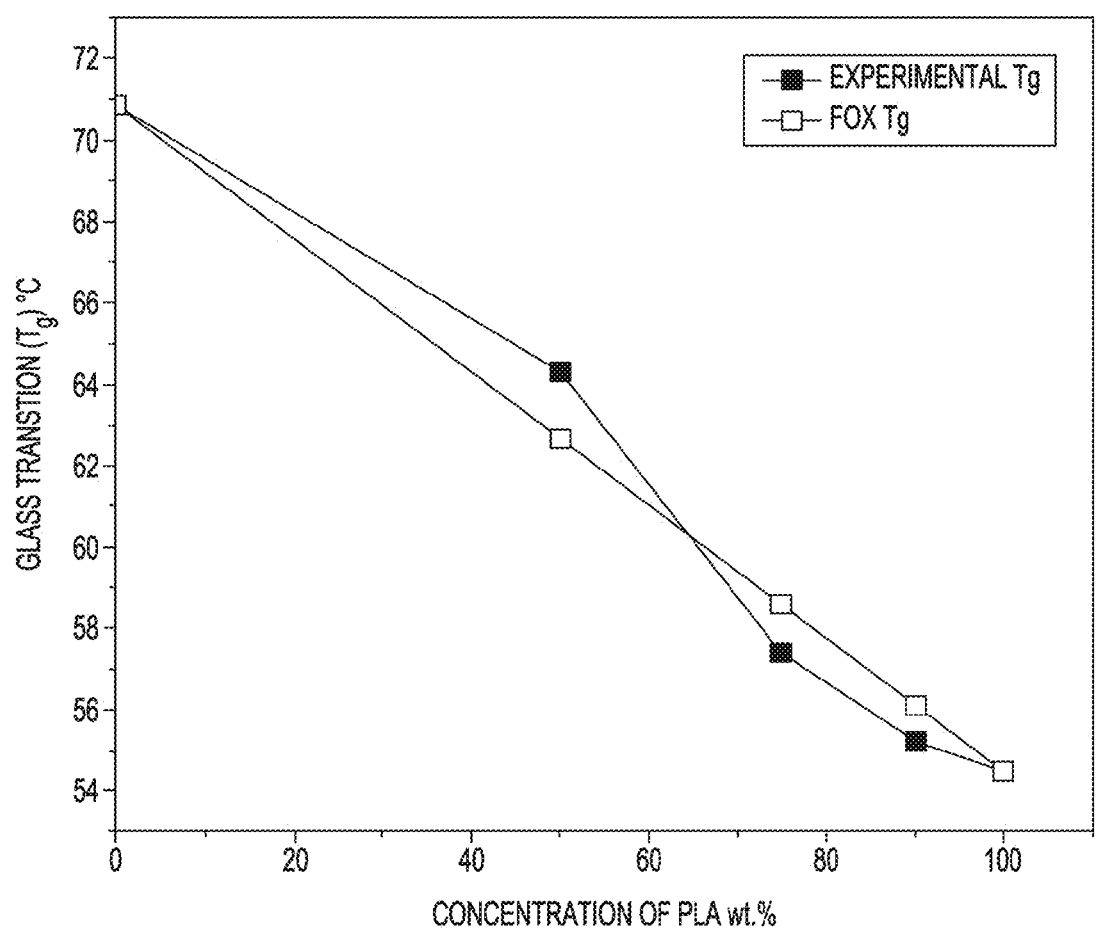
FIG. 4 illustrates a comparison of Flory-Fox equation $T_g$ values of various butyrated lignin/poly(lactic acid) blends to actual measured values of $T_g$, in accordance with various embodiments of the present invention.

FIG. 4 illustrates experimental $T_g$ of the blends and the $T_g$ predicted by the Flory-Fox equation (equation used for miscible polymer blends). Experimental $T_g$ does not match predicated $T_g$; therefore, there is only some compatibility between B-lignin and PLA phases, and B-lignin and PLA are not fully miscible.

Example 5

Dynamic Mechanical Analysis

DMA measurements were taken using compression molded pieces of the blends of Example 2, as described in the General section. DMA measurements allow further study on the compatibility and interaction between B-lignin and PLA, and also provide an alternative method to determine glass transition temperature.

Figure 5:
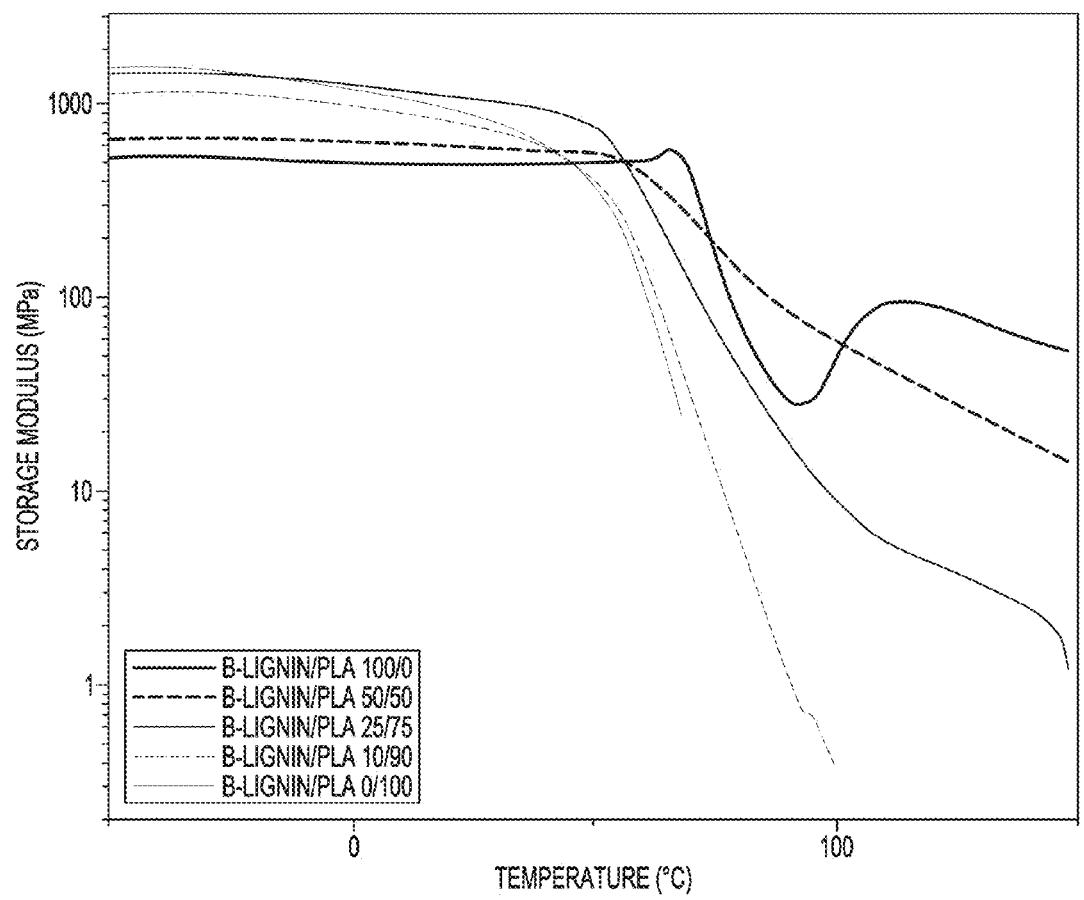
FIG. 5 illustrates the storage modulus (E') curves of various butyrated lignin/poly(lactic acid) blends, in accordance with various embodiments of the present invention.

The glass transition behavior and the storage modules (E') of the investigated samples are shown in FIG. 5. At low temperatures, all samples appear to be in the glassy state, and E' is independent of temperature. Storage modulus (E') values and glass transition temperature ($T_g$) are provided in Table 2. A strong decrease of the plateau modulus occurs at high temperature for the blends having higher proportions of B-lignin. Furthermore, pure B-lignin and B-lignin/PLA 90/10 blend show a terminal response with increasing temperature, exhibiting a drop in modulus to 0 MPa; whereas the E' modulus of blends with high PLA content show a non-terminal response.

Cold crystallization after $T_g$ in the PLA phase might be the driving force supporting the stiffness of materials at high temperatures. However, despite a higher PLA content, the E' value of B-lignin/PLA 75/25 is higher than pure B-lignin and B-lignin/PLA 90/10 at lower temperatures. A potential reason for this behavior of the B-lignin/PLA 75/25 blend might be the presence of a crystalline phase. From the storage modulus curves shown in FIG. 6 it can be seen that B-lignin/PLA 75/25 showed a prominent crystal melting peak when compared to pure B-lignin and B-lignin/PLA 90/10. Therefore, at low temperatures, the stiffness (E') of B-lignin/PLA 75/25 in the glassy phase may be supported by the concentration of the B-lignin phase, while the stiffness of the sample at high temperatures may be supported by the cold crystallization in the PLA phase.

TABLE 2

Glass transition temperature ($T_g$) and storage modulus (E') in the glassy state of B-lignin/PLA blends

| Sample | $T_g$ from DMA experiment (° C.) | E' in glassy state (MPa) |
|---|---|---|
| B-lignin/PLA 100/0 | 54 | 1432 |
| B-lignin/PLA 90/10 | 55 | 1408 |
| B-lignin/PLA 75/25 | 57 | 1118 |
| B-lignin/PLA 50/50 | 64 | 665 |
| B-lignin/PLA 0/100 | 70 | 515 |

Figure 6:
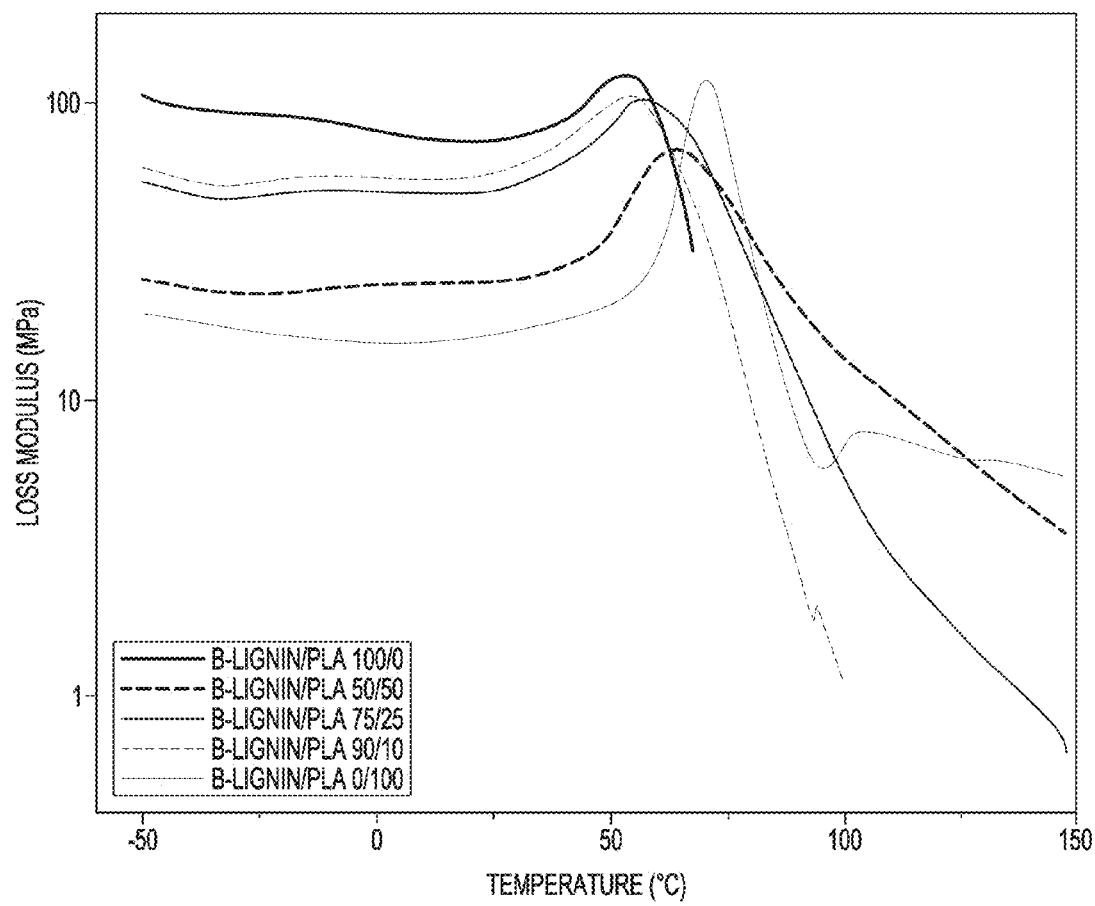
FIG. 6 illustrates the loss modulus (E") curves of various butyrated lignin/poly(lactic acid) blends, in accordance with various embodiments of the present invention.

The $T_g$ of all investigated samples shown in Table 2 was determined from the peak temperature of the loss modulus (E") curves, as shown in FIG. 6. $T_g$ decreases from approximately 70° C. to 54° C. with increasing B-lignin content, which is in accordance with the DSC results. The inclination of the plateau region in the E' versus T curves can be indicators of compatibility, along with the presence of a single $T_g$ peak for each blend. With greater proportions of B-lignin in PLA (B-lignin/PLA 50/50), the loss peak becomes broader and the intensity decreases compared to pure PLA E" curve. However, with further increasing B-lignin content, the width of the peak decreases and the peak height increases. The change in peak width and height with respect to the composition indicates a high level of compatibility. For B-lignin/PLA 50/50, the $T_g$ peak indicates a distinct transition in phase behavior from the PLA-rich phase to the B-lignin-rich phase. On either side of the transition, the $T_g$ behavior is mostly governed by the major phase in the blend.

Table 3 shows the storage modulus values of the B-lignin/PLA blends. B-lignin/PLA 75/25 exhibited the highest storage modulus at 25° C.

TABLE 3

Glass transition temperature ($T_g$) and storage modulus (E') of B-lignin/PLA blends.

| Sample | $T_g$ from DMA experiment (C) | $T_g$ from Fox equation | Storage Modulus (E') at 25° C. (MPa). |
|---|---|---|---|
| B-lignin/PLA 100/0 | 54 | 54 | 871 |
| B-lignin/PLA 90/10 | 55 | 56 | 781 |
| B-lignin/PLA 75/25 | 57 | 58 | 1055 |
| B-lignin/PLA 50/50 | 64 | 62 | 599 |
| B-lignin/PLA 0/100 | 70 | 70 | 480 |

Example 6

Thermogravimetric Analysis (TGA)

Figure 7:
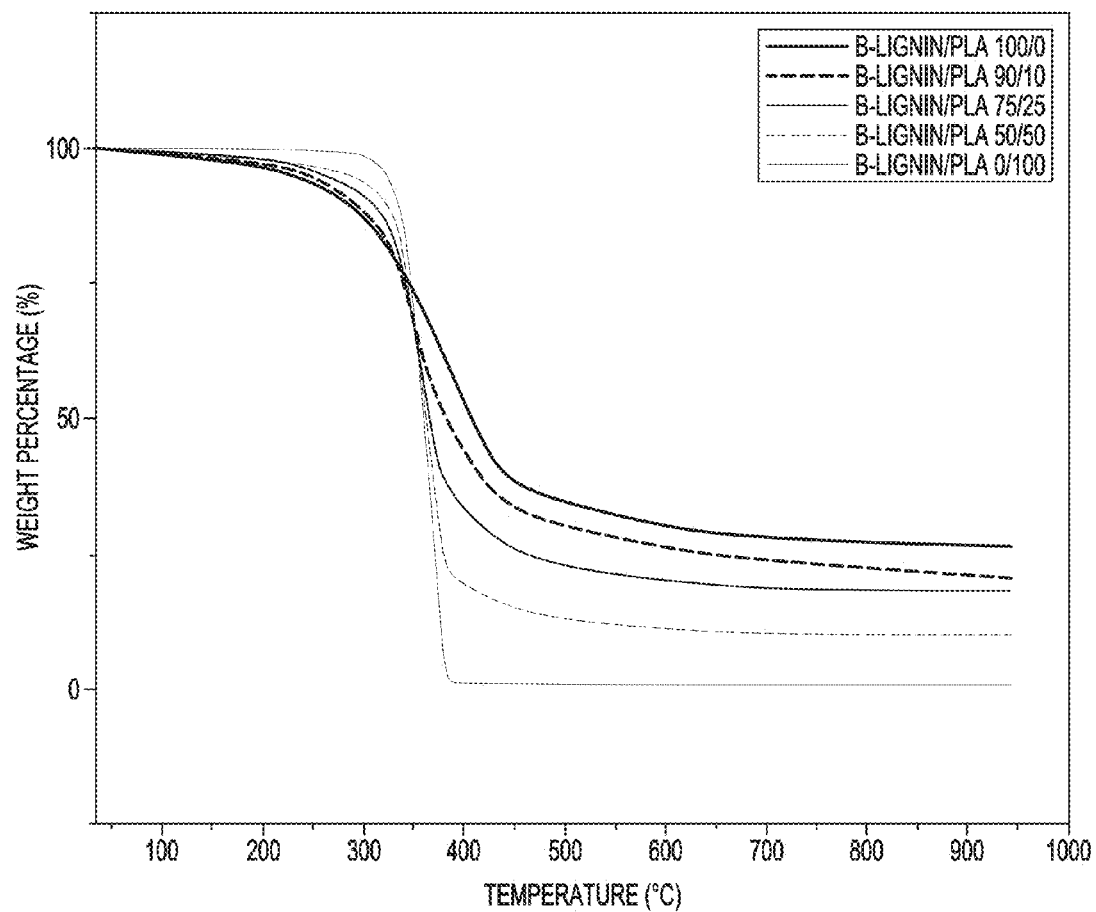
FIG. 7 illustrates thermogravimetric analysis (TGA) weight loss curves of various butyrated lignin/poly(lactic acid) blends, in accordance with various embodiments of the present invention.
Figure 8:
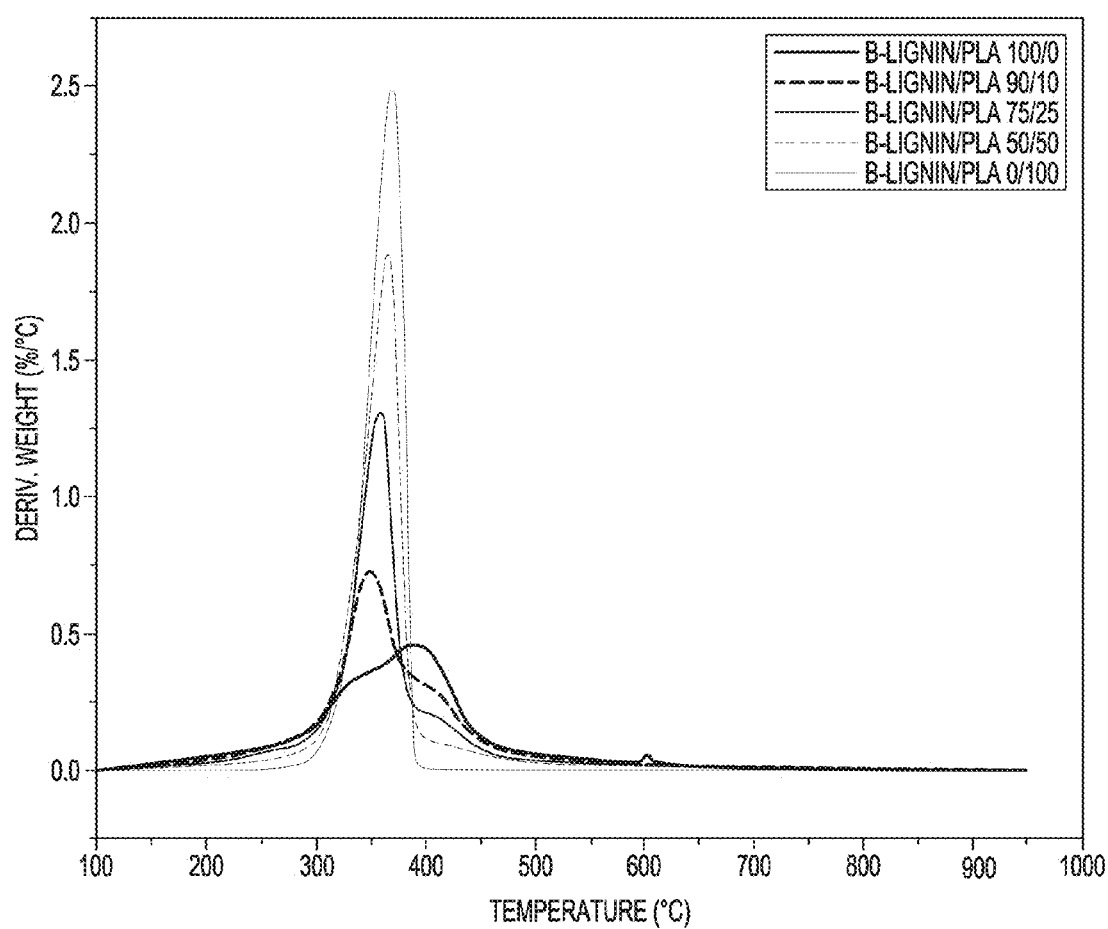
FIG. 8 illustrates derivative of weight loss (DTG) curves of various butyrated lignin/poly(lactic acid) blends, in accordance with various embodiments of the present invention.

TGA measurements were taken using the fibers of Example 3, which were first cut into smaller pieces. The decomposition profiles are given in FIG. 7 and the first derivative of the TGA curves (DTG) is shown in FIG. 8. The thermal degradation profiles of the investigated materials reveal a systematic enhancement in the stability of the blends with the increasing PLA content from 0 to 50 wt. %. Pure PLA appears to be stable without any a major loss in weight up to 350° C., whereas B-lignin and their blend compositions show a continuous decrease in weight loss profile. A slight weight loss below 100° C. can be seen and which was likely due to the dehydration of the absorbed moisture after processing of the samples. Table 4 shows the onset temperature at 1% weight loss (determined by the tangent point of the weight loss curves) which shifts toward higher temperatures with increasing PLA. The broad degradation reaction between 200 to 600° C. may be associated with the degradation of lignin.

The TGA curves also provide information of blend composition on the residual weight of carbon obtained after 800° C., given in Table 4. Degradation of lignin in inert atmosphere allows the conversion of lignin into carbon without oxidation of the residue. Hence, the final carbon residue is quite stable without loss in weight up to 950° C. The weight percent of carbon formed as residual decreases from 27 wt. % to 0.36 wt. % with increasing PLA content. As lignin is the main source of carbon content, reducing lignin content results in a systematic loss in carbon content for all blends. Therefore, residual weights from TGA results, which correspond to carbon yield from the lignin based fibers, can be used to optimize the production process to obtain a higher carbon yield in final fibers.

The maximum decomposition peak temperatures ($T_{max}$) in the DTA curves for the neat and blended samples are also listed in Table 4. $T_{max}$ of B-lignin slightly increases with increasing PLA content. However, B-lignin/PLA 100/0 having two distinct $T_{max}$ at approximately 334° C. and 393° C., reveals a two-stage degradation process. The degradation step at the lower temperature might be due to the presence of additional components in the bulk sample. With incorporation of PLA in B-lignin, peak intensity increases with a simultaneous decrease in the peak width. The influence of blending PLA into B-lignin on the peak behavior of $T_{max}$ can be attributed to the presence of molecular level interactions between the two phases.

TABLE 4

Characteristic thermal degradation temperatures and weight percent of residual carbon from TGA.

| Sample | Onset temperature of 1% weight loss (° C.) | $T_{max}$ (° C.) | Residual carbon at 800° C. (wt. %) |
|---|---|---|---|
| B-lignin/PLA 100/0 | 163 | 334 and 393 | 27.3 |
| B-lignin/PLA 90/10 | 177 | 348 | 22.38 |
| B-lignin/PLA 75/25 | 197 | 358 | 17.99 |
| B-lignin/PLA 50/50 | 219 | 364 | 9.8 |
| B-lignin/PLA 0/100 | 310 | 368 | 0.36 |

Example 7a

Tensile Modulus of B-lignin/PLA Fibers

Figure 9A:
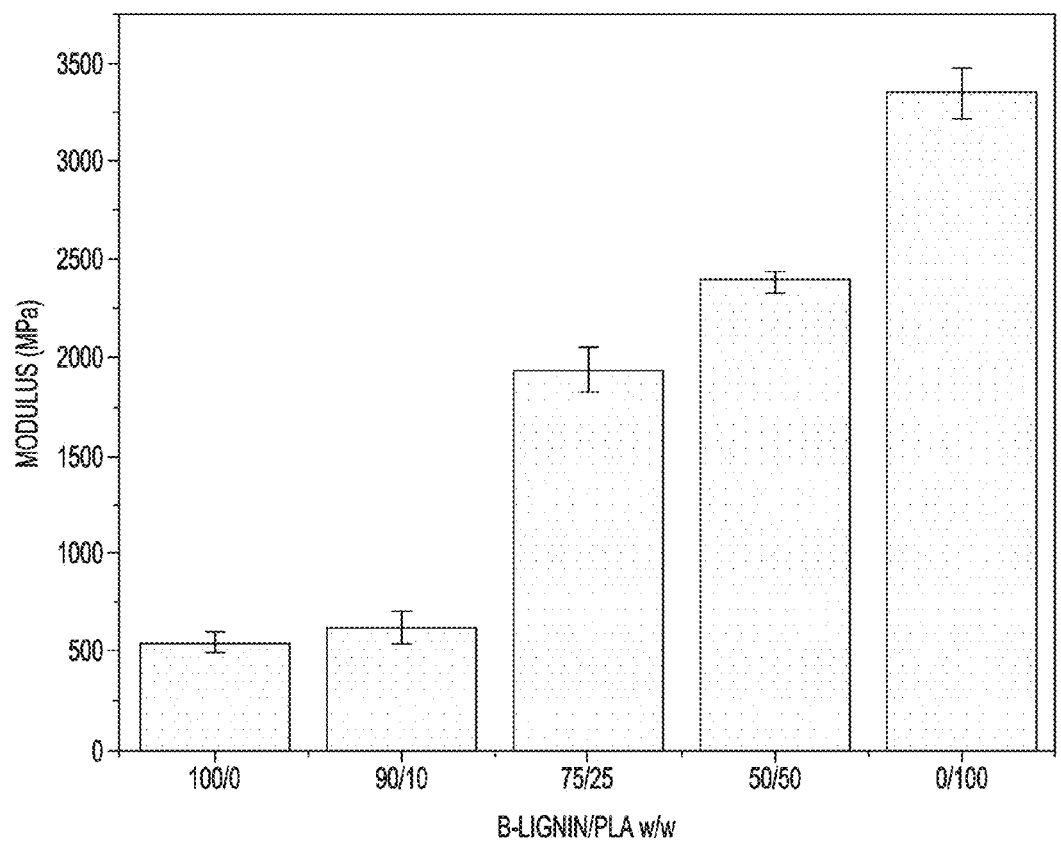
FIG. 9a illustrates the tensile modulus of fibers made of various butyrated lignin/poly(lactic acid) blends, in accordance with various embodiments of the present invention.

The tensile modulus of individual fibers was measured by following the ASTM standard (D 3379-75) with Q800 DMA from TA instruments (New Castle, Del.), using tensile film clamps. A gauge length of 1.27 mm was used to measure the modulus of fibers from an average of 6 samples. Fiber diameter was measured by Olympus BX51 optical microscopy. DMA time sweep tests were conducted under a fixed frequency for 10 mins for each sample. FIG. 9a and Table 5 illustrate the tensile modulus values of various B-lignin/PLA fibers.

TABLE 5

Modulus of B-lignin/PLA fibers.

| Sample | Diameter (μm) | Modulus (MPa) |
| --- | --- | --- |
| B-lignin/PLA 100/0 | 154 ± 41 | 542 ± 42 |
| B-lignin/PLA 90/10 | 131 ± 37 | 633 ± 80 |
| B-lignin/PLA 75/25 | 122 ± 29 | 1941 ± 107 |
| B-lignin/PLA 50/50 | 110 ± 18 | 2383 ± 60 |
| B-lignin/PLA 0/100 | 159 ± 20 | 3344 ± 122 |

As shown in FIG. 9a, pure B-lignin fiber contained the lowest modulus of about 550 MPa, while pure PLA fiber had the highest modulus of about 3400 MPa. The modulus of B-lignin/PLA blen fibers increased with increasing PLA content. The modulus increased prominently from about 640 MPa to about 2000 MPa for fibers with 10 wt. % and 25 wt. % of PLA, respectively, possibly explained by the high compatibility between B-lignin and PLA phases in the fibers. Further increasing PLA content to 50% did not cause a significant improvement in the modulus as observed in blends with 10 and 25 wt. % of PLA.

At room temperature, the elastic modulus from dynamic mechanical analysis of B-lignin/PLA fibers showed a different tendency when compared to the dynamic flexural modulus of the bulk samples, as shown in Tables 3 and 5. The moduli of fiber samples shown in Table 5 steadily increased with increasing PLA content, whereas in bulk samples there was a decreasing trend as PLA content changed from 25 wt. % to 100 wt. %. The processing conditions may help to explain the phase behavior in the blends. While spinning fine fibers, a predominantly unidirectional orientation of PLA crystalline phase in the fiber direction may play a dominant role in controlling the overall mechanical properties. Thus, with increasing PLA content, a direct increase in the modulus may be expected. In the bulk samples, processing samples by compression molding provided equilibrium samples with negligible orientation in the crystalline PLA phase. A microphase separation in the blends in equilibrium state could respond collectively to the applied load. Thus, the moduli values from the fiber samples may not be comparable. However, other theories may explain the difference in the overall trend of modulus between the fibers and the bulk samples, and the present invention in no way is limited to any particular theory of operation.

Example 7b

Tensile Modulus of B-lignin/PLA Fibers

Tensile tests were performed using dynamic mechanical analyzer (DMA) (Model Q800, TA Instruments) equipped with tensile clamps in iso-strain mode. The tests were conducted on fine fibers with diameter range of 100-200 μm. Stress-strain curves were measured by stretching the fibers at a strain rate of 50 μm/min. Tensile tests were conducted with B-lignin/PLA blend fibers and pure PLA fibers.

Figure 9B:
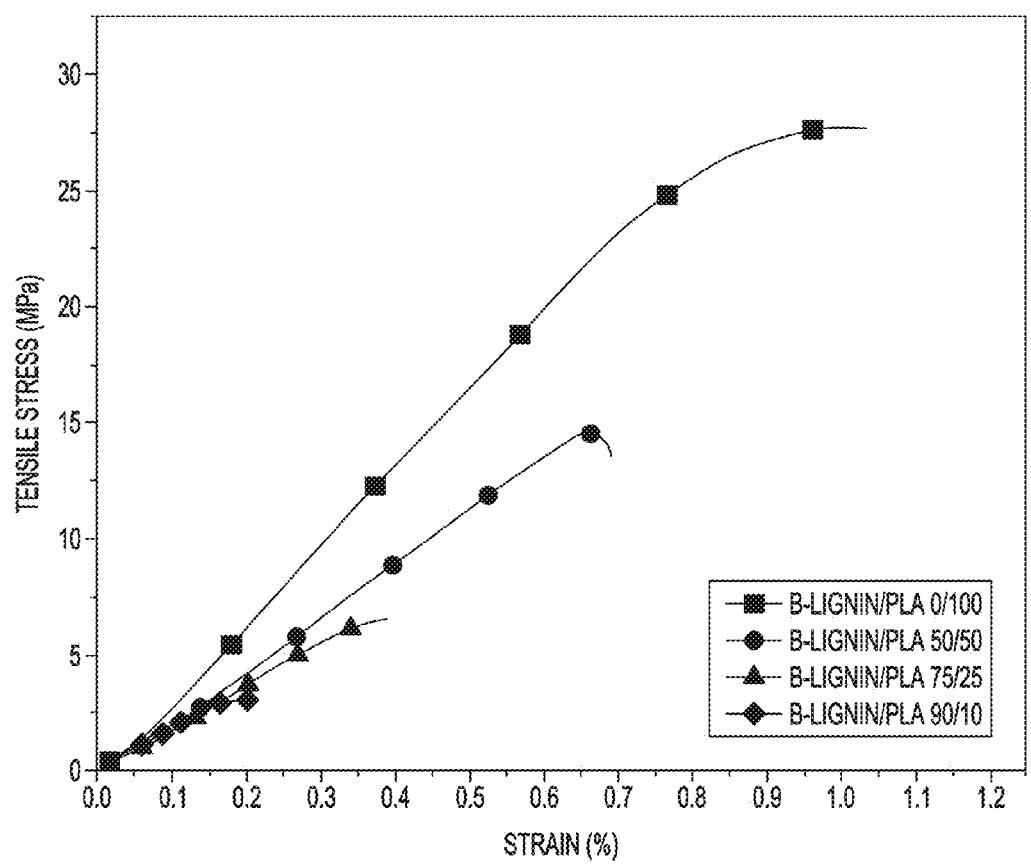
FIG. 9b illustrates tensile stress versus strain of various fibers, in accordance with various embodiments of the present invention.
Figure 9C:
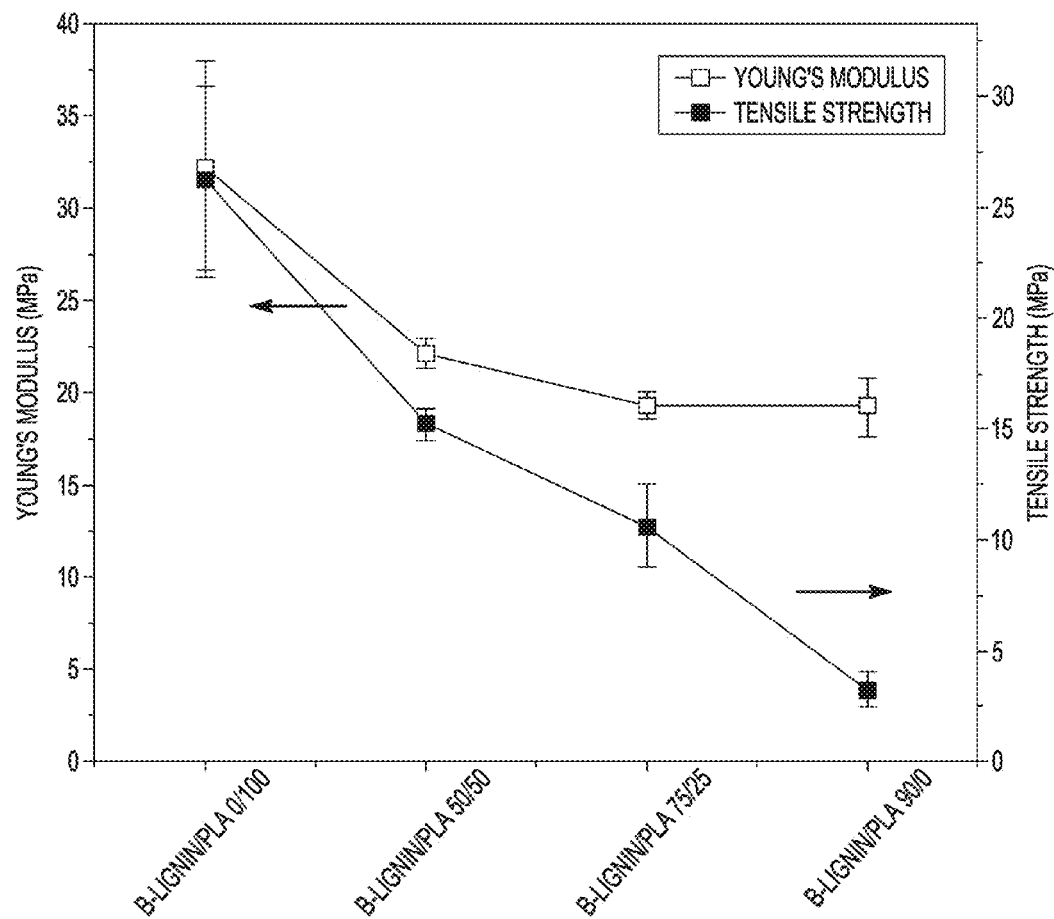
FIG. 9c illustrates Young's modulus and tensile strength of various fibers, in accordance with various embodiments of the present invention.

The stress-strain curves of pure PLA and B-lignin/PLA blends are shown in FIG. 9b and the corresponding Young's modulus and tensile strain at break measured from the stress-strain curves are shown in FIG. 9c. Differences in the stress-strain curves were found with increase in B-lignin concentration in the blends. Pure PLA fibers exhibited the highest tensile strength and strain at break compared to B-lignin/PLA blends. Increases in the weight percent of B-lignin in the blends had some detrimental effects on the mechanical properties. The high mechanical properties of pure PLA fibers are a result of the semi-crystalline nature of PLA. The crystalline phase in the polymer matrix provided rigid crosslinking sites, enhancing the stiffness of the material similar to the crosslinking density in thermoset resins. In addition, the orientation of the crystalline structure may contribute to an increase in mechanical properties.

Example 8

Characterization of Morphology

Figure 10A:
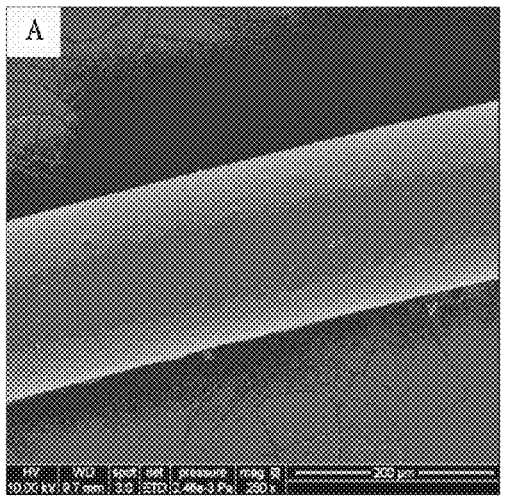
FIG. 10a shows a scanning electron microscope image of a 50/50 butyrated lignin/poly(lactic acid) fiber, in accordance with various embodiments of the present invention.
Figure 10C:
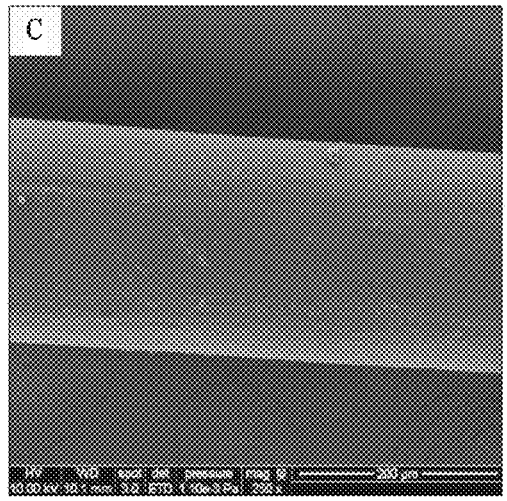
FIG. 10c shows a scanning electron microscope image of a 90/10 butyrated lignin/poly(lactic acid) fiber, in accordance an embodiments of the present invention.
Figure 10B:
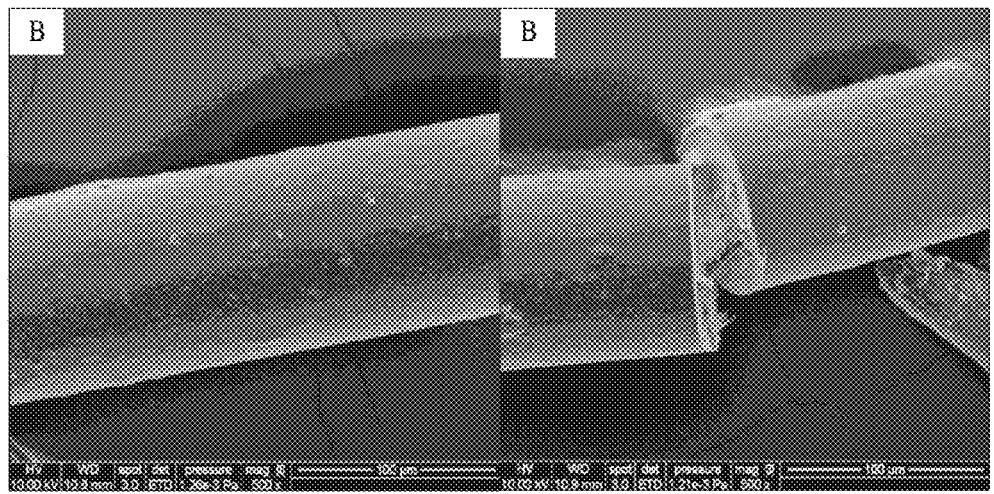
FIG. 10b, left and right, each show a scanning electron microscope image of a 75/25 butyrated lignin/poly(lactic acid) fiber, in accordance with various embodiments of the present invention.
Figure 10G:
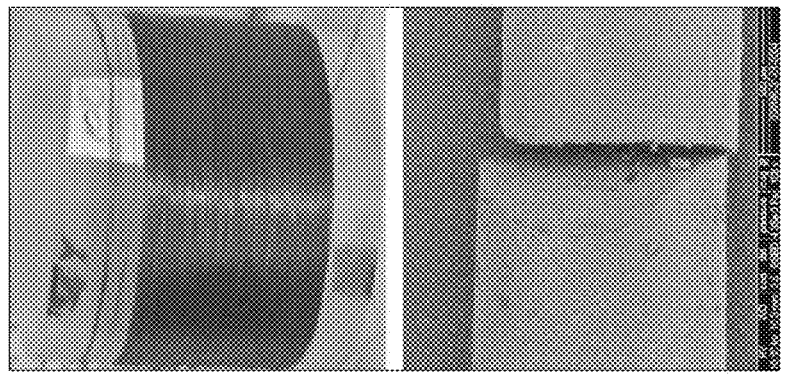
FIG. 10g shows spooled fibers (top) and a scanning electron microscope image (bottom) of a 100/0 butyrated lignin/poly(lactic acid) fiber, in accordance an embodiments of the present invention.

The surface morphology of fibers extracted by melt spinning were initially examined by scanning electron microscopy (SEM) to verify the compatibility between B-lignin and PLA. FIG. 10a shows a scanning electron microscope image of a 50/50 butyrated lignin/poly(lactic acid) fiber; FIG. 10b, left and right, each show a scanning electron microscope image of a 75/25 butyrated lignin/poly(lactic acid) fiber; FIG. 10c shows a scanning electron microscope image of a 90/10 butyrated lignin/poly(lactic acid) fiber, in accordance an embodiments of the present invention. FIGS. 10a-c shows that fiber of all B-lignin/PLA blends exhibit a cylindrical morphology which is independent of the composition of the blends. Macrophase separation, typically observed for immiscible blends, does not occur here. FIG. 10b shows a fiber spun from a B-lignin/PLA 75/25 blend having a diameter of about 80 μm. The SEM images of fiber cross sections show the morphology that many small fibers align inside a larger, single fiber.

FIGS. 10d-g depict melt processed B-lignin fiber spools and B-lignin/PLA blend fiber spools. FIG. 10d-g show spooled fibers (top) and a scanning electron microscope image (bottom) of a 50/50, 75/25, 90/10, 100/0 butyrated lignin/poly(lactic acid) fiber, respectively. To facilitate fiber formation, all blends were processed at 180° C., which is above the melting temperature of PLA. As a result of the aromatic molecular structure of lignin, fibers with 90 and 100 wt. % of lignin were brittle and difficult to handle during post processing at room temperature. Esterification of lignin improved the processability of raw lignin and also enhanced the miscibility of lignin and PLA in the blends.

FIG. 11 shows fiber cross sections from different blends. FIG. 11a-e illustrate a transmission electron microscopy image of a 100/0, 50/50, 75/25, 90/10, and 0/100 butyrated lignin/poly(lactic acid) blend, respectively in accordance with various embodiments of the present invention. Phase separation can be seen in the TEM images of all blends, which indicates that B-lignin and PLA are phase separated on the micro-scale. The B-lignin phase appeared first as a discontinuous phase in B-lignin/PLA 50/50 blends, but changed into a continuous phase with increasing B-lignin content. The diameter of the inner fiber was less than about 1-2 μm. Other than the B-lignin/PLA 50/50 and 90/10 blends, the 75/25 blend showed a structure of B-lignin and PLA phase embedded in the phase of one another, which may be a reason for a stronger interaction and finer fiber morphology.

Figure 10F:
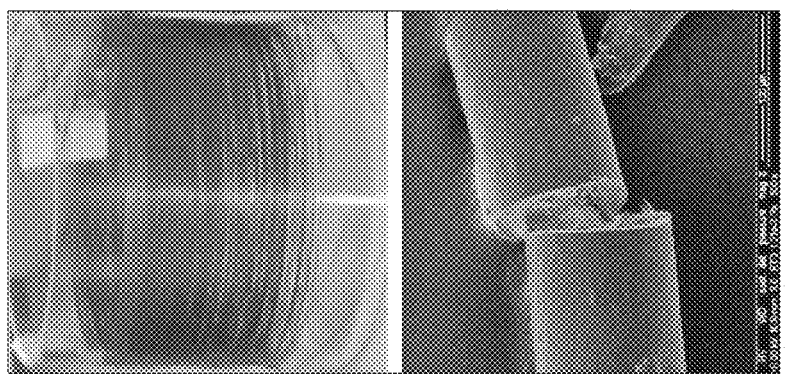
FIG. 10f shows spooled fibers (top) and a scanning electron microscope image (bottom) of a 90/10 butyrated lignin/poly(lactic acid) fiber, in accordance an embodiments of the present invention.
Figure 10E:
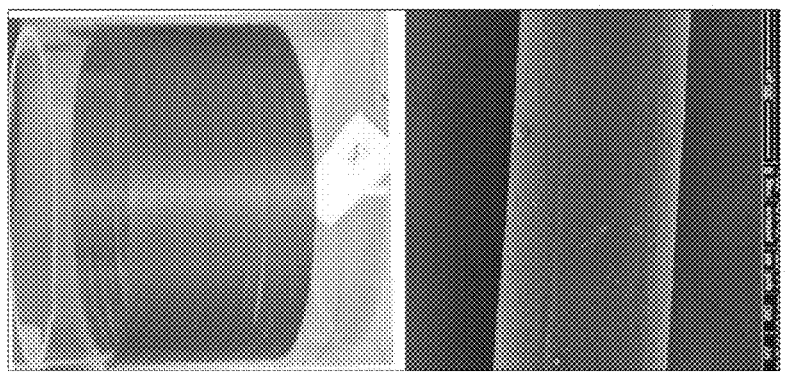
FIG. 10e shows spooled fibers (top) and a scanning electron microscope image (bottom) of a 75/25 butyrated lignin/poly(lactic acid) fiber, in accordance with various embodiments of the present invention.
Figure 10D:
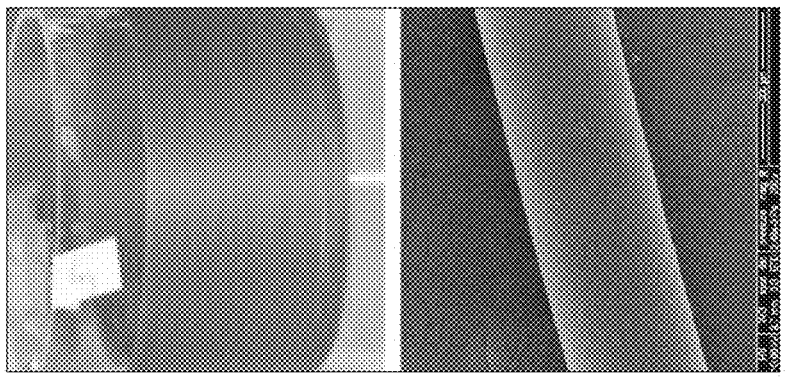
FIG. 10d shows spooled fibers (top) and a scanning electron microscope image (bottom) of a 50/50 butyrated lignin/poly(lactic acid) fiber, in accordance with various embodiments of the present invention.
Figure 11A:
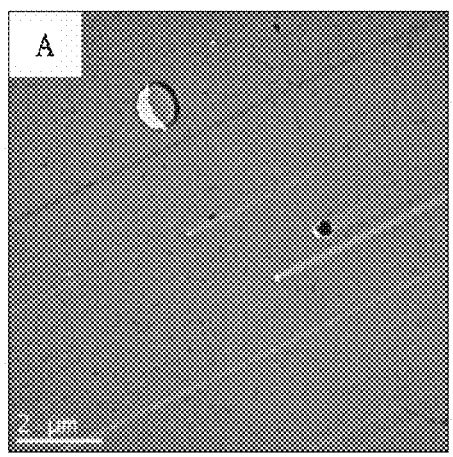
FIG. 11a illustrates a transmission electron microscopy image of a 100/0 butyrated lignin/poly(lactic acid) blend, in accordance with various embodiments of the present invention.
Figure 11B:
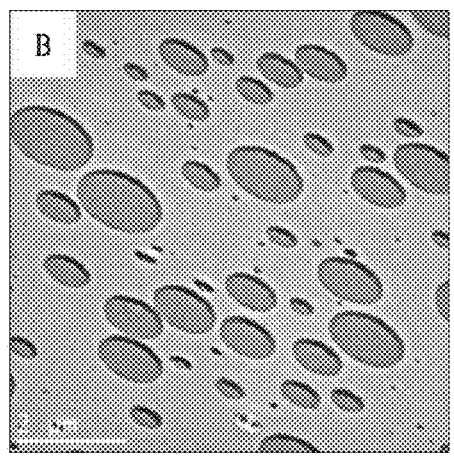
FIG. 11b illustrates a transmission electron microscopy image of a 50/50 butyrated lignin/poly(lactic acid) blend, in accordance with an embodiment of the present invention.
Figure 11C:
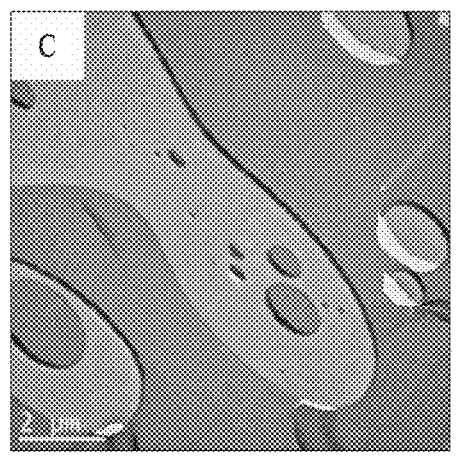
FIG. 11c illustrates a transmission electron microscopy image of a 75/25 butyrated lignin/poly(lactic acid) blend, in accordance with an embodiment of the present invention.
Figure 11D:
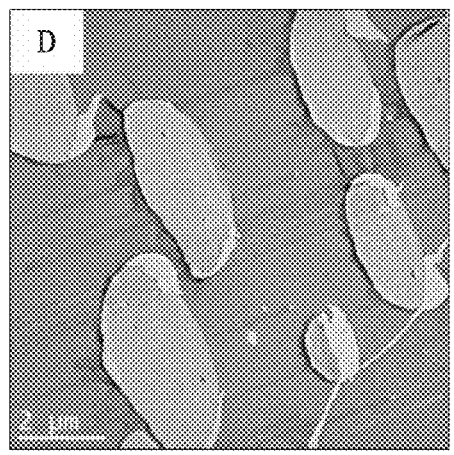
FIG. 11d illustrates a transmission electron microscopy image of a 90/10 butyrated lignin/poly(lactic acid) blend, in accordance with an embodiment of the present invention.
Figure 11E:
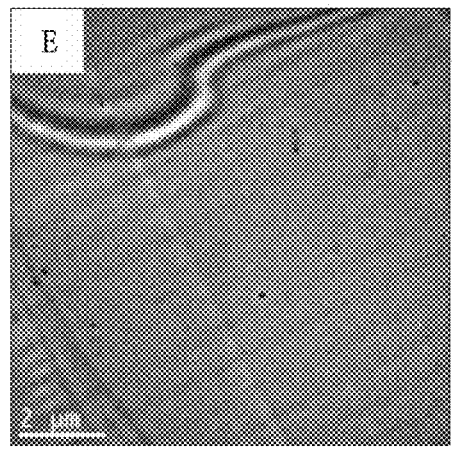
FIG. 11e illustrates a transmission electron microscopy image of a 0/100 butyrated lignin/poly(lactic acid) blend, in accordance with an embodiment of the present invention.

The morphology of the discontinuous phases in 50 and 90 wt. % B-lignin blends was driven by phase segregation in the form of fine fibers aligned parallel to the fiber axes inside the bulk fiber, with fine fibers having diameters of 1-2 μm visible in FIG. 10b (right) and FIG. 10f (bottom).

Example 9

Carbonization of B-Lignin/PLA Fibers

The fibers of Example 3 were subjected to a thermostabilization step prior to carbonization, to prevent the fibers from fusing during the carbonization process. The fibers were placing into a ceramic crucible and then place into a tube furnace. Thermostabilization included first heating the fibers to 105° C. at 1° C./min to reduce moisture content, and then heating to 250° C. at 0.25° C./min and held at this temperature for 5 h in an oxygen stream. The thermostabilized fibers were then carbonized under a nitrogen atmosphere at 1000° C., using a heating rate of 180° C./h. After reaching 1000° C., the temperature was maintained for 20 min before cooling down to room temperature.

Figure 12A:
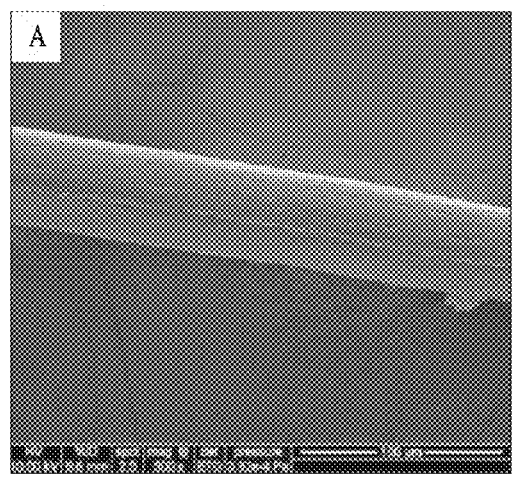
FIG. 12a illustrates a scanning electron microscope image of a butyrated lignin/poly(lactic acid) 50/50 fiber, in accordance with an embodiment of the present invention.
Figure 12B:
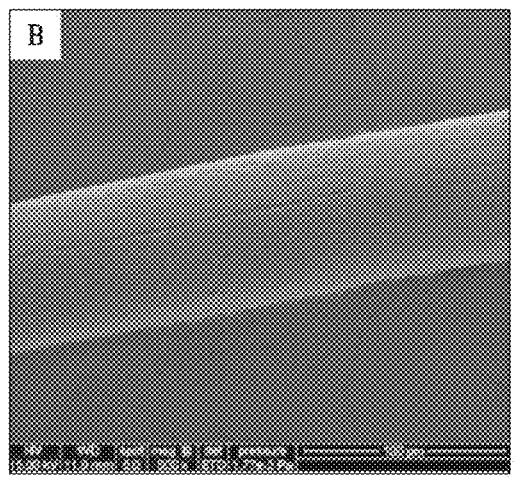
FIG. 12b illustrates a scanning electron microscope image of a butyrated lignin/poly(lactic acid) 75/25 fiber, in accordance with an embodiment of the present invention.
Figure 12C:
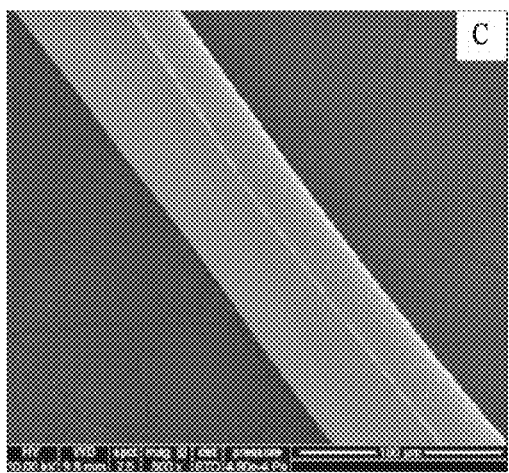
FIG. 12c illustrates a scanning electron microscope image of a butyrated lignin/poly(lactic acid) 90/10 fiber, in accordance with an embodiment of the present invention.
Figure 13A:
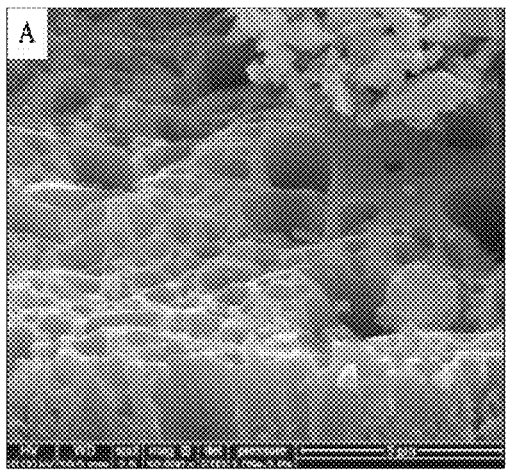
FIG. 13a illustrates a cross-sectional scanning electron microscope image of a carbon fiber derived from 50/50 butyrated lignin/poly(lactic acid) fiber, in accordance with an embodiment of the present invention.
Figure 13B:
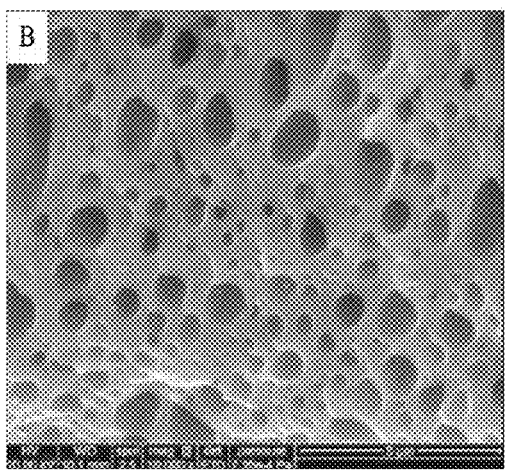
FIG. 13b illustrates a cross-sectional scanning electron microscope image of a carbon fiber derived from 75/25 butyrated lignin/poly(lactic acid) fiber, in accordance with an embodiment of the present invention.
Figure 13C:
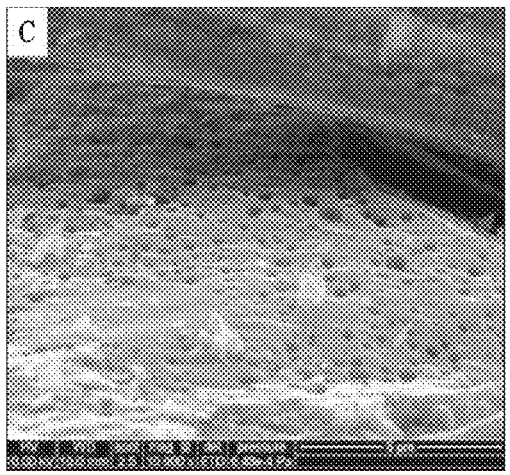
FIG. 13c illustrates a cross-sectional scanning electron microscope image of a carbon fiber derived from 90/10 butyrated lignin/poly(lactic acid) fiber, in accordance with an embodiment of the present invention.
Figure 13D:
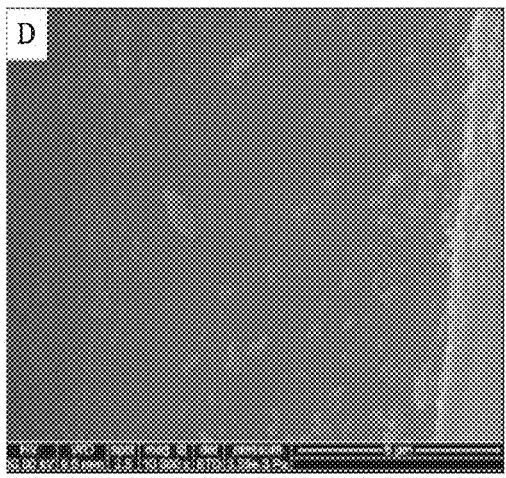
FIG. 13d illustrates a cross-sectional scanning electron microscope image of a carbon fiber derived from 100/0 butyrated lignin/poly(lactic acid) fiber, in accordance with an embodiment of the present invention.

FIGS. 12a-12c show scanning electron microscope images of 50/50, 75/25, and 90/10 B-lignin/PLA fibers, respectively. The cylindrical morphology of carbon fibers derived from the 75/25 B-lignin/PLA blend appeared slightly more consistent than those derived from 50/50 and 90/10 B-lignin/PLA blends. FIGS. 13a-d show cross-sectional scanning electron microscope images of carbon fibers derived from 50/50, 75/25, 90/10, and 100/0 B-lignin/PLA fibers, respectively. The cross-sectional images show pores or microvoids in the fibers derived from B-lignin/PLA blends. The microvoids may be attributed to PLA content. PLA forming a phase within the fiber can evaporate during carbonization of the fiber, leaving a void or pore behind.

The size of the microvoids seen in FIGS. 13a-d can be seen to decrease with increasing B-lignin content. The voids do not occur in the carbon fibers derived from pure B-lignin, shown in FIG. 13d. The microvoids seen in FIG. 13b, in carbon fibers derived from the 75/25 B-lignin/PLA blend, have more uniformly scattered microvoids than those derived from the 50/50 and 90/10 blends shown in FIGS. 13a and 13c, respectively. The microvoids in FIGS. 13a-13c exhibit along the fiber orientation, which can also be seen externally as channels on the surface of the carbon fibers, as visible in FIGS. 12a-c.

The porosity in the B-lignin/PLA based carbonized fibers was quantized by Brunauer, Emmett and Teller (BET) analysis. The porosity of the carbon fibers prepared from B-lignin/PLA 75/25 was quantized in reference to the PAN based standard carbon fibers. The average BET surface area of the carbon fiber was 535 $m^2/g$ in lignin based carbon fiber, as compared to 5.13 $m^2/g$ in PAN-based standard carbon fibers. In accordance with the surface area, carbon fibers had a total average pore volume of was 0.323 $cm^3/g$, as compared to $7.68 \times 10^{-3}$ $cm^3/g$ in PAN-based standard carbon fibers.

Example 10

Qualitative and Quantitative Analysis of Lignin Ester by NMR

Before and after esterification, $^1$H NMR spectroscopy was performed to study the nature of ester bonds formed during butyration as performed in Example 1. The $^1$H NMR spectra shown in FIGS. 14a and 14b corresponds to kraft lignin and butyrated kraft lignin respectively. Table 6 includes chemical shift assessments comparing literature values (Thielemans, Wim; Woll, Richard P. Biomacromolecules 2005, 6, 1895-1905) with the experimental values.

Figure 14A:
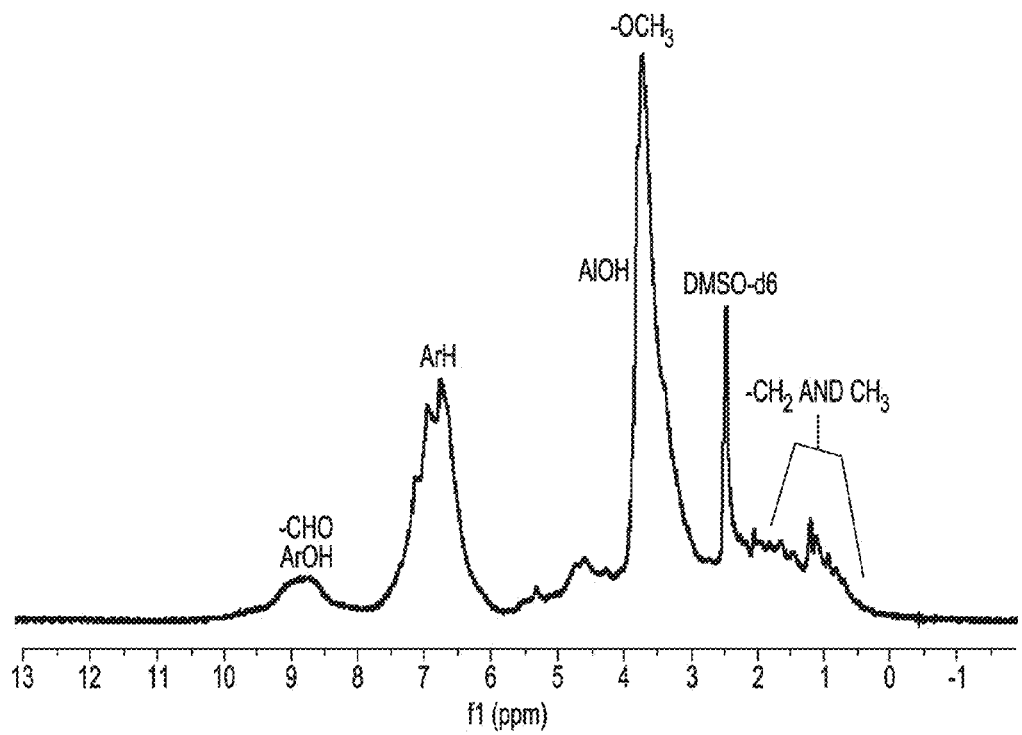
FIG. 14a illustrates a $^1$H NMR spectrum of kraft lignin, in accordance with an embodiment of the present invention.
Figure 14B:
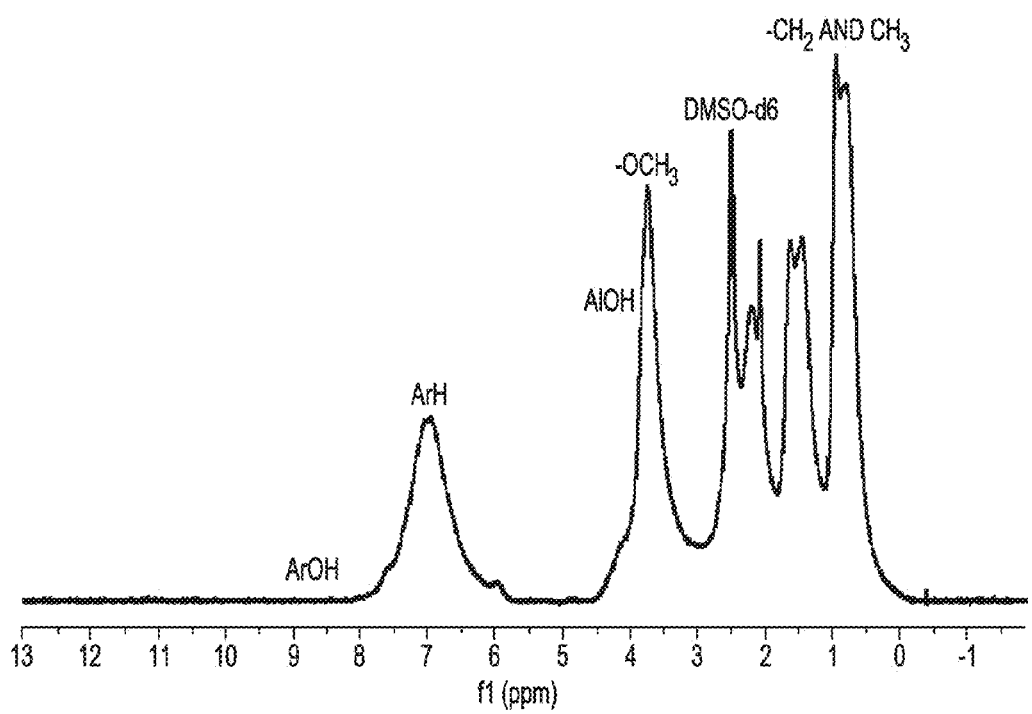
FIG. 14b illustrates a $^1$H NMR spectrum of butyrated kraft lignin, in accordance with an embodiment of the present invention.

A complete esterification of lignin can be qualitatively confirmed from the signals appearing between 0.5-2.4 ppm with simultaneous disappearance of aromatic hydroxyl (ArOH) (8-10.5 ppm) signal in the NMR spectra of modified lignin (FIG. 14a). The distinct signals between 0.5-2.4 ppm correspond to the α-$CH_2$ (2.0-2.4 ppm), β-$CH_2$ (1.25-1.8 ppm) and —$CH_3$ (0.5-1.09 ppm) groups in the newly formed butyl ester group. During the butyration of lignin, for a complete esterification, the total number of —OH groups are expected to be replaced by butyrate ester chains. However, for quantifying the conversion of —OH groups to esters, it is necessary to measure the total ArOH and aliphatic hydroxyl (AlOH) groups separately. Due to the interference of the signals in the $^1$H NMR spectra, it is difficult to measure the exact number of —OH groups. From the literature data it can observed that the peak corresponding ArOH (8-10.5 ppm) in FIG. 14a overlaps with the aldehyde (—CHO) groups, and the peak corresponding to AlOH (2.7-4 ppm) groups is from AlOH and methoxy (—$OCH_3$) groups. Therefore, in this region of the NMR, the proportion of the integration area corresponding to the aldehyde (—CHO) and methoxy (—$OCH_3$) groups, as determined from the literature values, was subtracted from the total integration area to measure the total number of —OH groups in pure lignin. The signal for aromatic H (8-6.2 ppm) was used as a reference signal to standardize the units for all three substances. The area under the characteristic peaks for the —$CH_3$ group (0.5-1.09 ppm) in the butyrate ester group was measured to estimate the number of ester chains present on lignin after butyration. From the table it can be inferred that the total amount of ArOH and AlOH replaced by ester groups is equal to 1.01 units which is approximately equal to the number of ester chains (1.159 units) as calculated from the —$CH_3$ bonds.

TABLE 6

Functional groups present on lignin listed from literature in comparison with the investigated lignin.

| Functional groups | Softwood lignin[a] | Softwood lignin[b] | Butarated softwood lignin[b] |
|---|---|---|---|
| Aromatic hydroxyl (ArOH) | 0.64 | 0.634 | 0.012 |
| Aliphatic hydroxyl (AlOH) | 0.439 | 0.426 | 0.037 |
| Carboxylic acid (—COOH) | 0.11 | NM | NM |
| Methoxy (—$OCH_3$) | 0.76 | NM | NM |
| Aromatic hydrogen (ArH)[ref] | 2.5 | 2.5 | 2.5 |
| Aldehyde (—CHO) | <0.02[a] | <0.02[a] | <0.02[a] |
| —$CH_3$ | — | 0.139 | 1.159 |

All the values in the table are determined using $^1$H NMR integration values, and are proportional to the number of moles of the designated functional group, as standardized by the reference.
[ref]reference signal
[a]Values taken from Thielemans, Wim; Woll, Richard P. Biomacromolecules 2005, 6, 1895-1905.
[b]experimental values from the present $^1$H NMR investigation
NM not measured Example 11

XXX

XXX

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a composition comprising: lignin comprising at least one esterified —OH group, wherein the esterified —OH group has the structure —OC(O)R, wherein each R is independently a $C_1$-$C_{30}$ hydrocarbyl group; and poly(lactic acid).

Embodiment 2 provides the composition of Embodiment 1, wherein the weight ratio of the esterified lignin to the poly(lactic acid) is about 1:1-999:1 by weight.

Embodiment 3 provides the composition of any one of Embodiments 1-2, wherein the weight ratio of the esterified lignin to the poly(lactic acid) is about 1.9:1-9:1 by weight.

Embodiment 4 provides the composition of any one of Embodiments 1-3, wherein the weight ratio of the esterified lignin to the poly(lactic acid) is about 3:1 by weight.

Embodiment 5 provides the composition of any one of Embodiments 1-4, wherein the esterified lignin is derived from at least one of softwood lignin, hardwood lignin, lignin obtained from a sulphite pulping process, lignin obtained from a soda pulping process, lignin obtained from an organosolv process, lignin obtained from a kraft process, and lignin extracted using an ionic liquid.

Embodiment 6 provides the composition of any one of Embodiments 1-5, wherein about 50-100% of the —OH groups on the lignin are esterified.

Embodiment 7 provides the composition of any one of Embodiments 1-6, wherein about 100% of the —OH groups on the lignin are esterified.

Embodiment 8 provides the composition of any one of Embodiments 1-7, wherein each R group is a $C_1$-$C_{30}$ alkyl group.

Embodiment 9 provides the composition of any one of Embodiments 1-8, wherein each R group is a $C_1$-$C_{10}$ alkyl group.

Embodiment 10 provides the composition of any one of Embodiments 1-9, wherein each R group is a propyl group.

Embodiment 11 provides the composition of any one of Embodiments 1-10, wherein the poly(lactic acid) comprises at least one of poly(L-lactic acid), poly(D-lactic acid), and poly(D,L-lactic acid).

Embodiment 12 provides the composition of any one of Embodiments 1-11, wherein the degree of polymerization of the poly(lactic acid) is about 2-10,000,000

Embodiment 13 provides the composition of any one of Embodiments 1-12, wherein the composition has a glass transition temperature of about 40-70° C.

Embodiment 14 provides the composition of any one of Embodiments 1-13, wherein the composition has a melting temperature of about 150-170° C.

Embodiment 15 provides the composition of any one of Embodiments 1-14, wherein the esterified lignin and the PLA are not fully miscible.

Embodiment 16 provides the composition of any one of Embodiments 1-15, wherein the composition has a storage modulus in the glassy state of about 500 to about 1500 MPa.

Embodiment 17 provides the composition of any one of Embodiments 1-16, wherein the composition has a storage modulus at about 100° C. of about 2-1000 MPa.

Embodiment 18 provides the composition of any one of Embodiments 1-17, wherein the composition has a storage modulus at about 25° C. of about 500-1200 MPa.

Embodiment 19 provides the composition of any one of Embodiments 1-18, wherein the composition has a loss modulus at about 100° C. of about 5-12 MPa.

Embodiment 20 provides the composition of any one of Embodiments 1-19, wherein the composition has a loss modulus at about 25° C. of about 20-100 MPa.

Embodiment 21 provides the composition of any one of Embodiments 1-20, wherein the composition has an onset temperature of about 1% weight loss of about 160-310° C.

Embodiment 22 provides the composition of any one of Embodiments 1-21, wherein the composition has a maximum thermal decomposition temperature of about 330-395° C.

Embodiment 23 provides the composition of any one of Embodiments 1-22, wherein the composition has about 0.4-30 wt. % residual carbon at about 800° C., based on the starting weight of the composition.

Embodiment 24 provides a fiber comprising the blend of any one of Embodiments 1-23.

Embodiment 25 provides the fiber of Embodiment 24, wherein the fiber has a diameter of about 1-300 μm.

Embodiment 26 provides the fiber of any one of Embodiments 24-25, wherein the fiber has a length of at least about 0.01 mm to about 1 km.

Embodiment 27 provides the fiber of any one of Embodiments 24-26, wherein the fiber has a tensile modulus of about 500 to about 4000 MPa.

Embodiment 28 provides the fiber of any one of Embodiments 24-27, wherein the fiber has a substantially cylindrical morphology.

Embodiment 29 provides the fiber of any one of Embodiments 24-28, wherein the esterified lignin and poly(lactic acid) do not exhibit macrophase separation.

Embodiment 30 provides the fiber of any one of Embodiments 24-29, wherein the esterified lignin and poly(lactic acid) have at least some microphase separation.

Embodiment 31 provides the fiber of any one of Embodiments 24-30, comprising a plurality of smaller fibers within a larger fiber.

Embodiment 32 provides the fiber of Embodiment 31, wherein each of the plurality of smaller fibers independently have a diameter that is about 1/10 to about 1/1,000,000 the diameter of the larger fiber.

Embodiment 33 provides the fiber of any one of Embodiments 31-32, wherein each of the plurality of smaller fibers independently has a diameter of less than about 1-2 μm.

Embodiment 34 provides the fiber of any one of Embodiments 31-33, wherein the plurality of smaller fibers substantially align with the length of the larger fiber.

Embodiment 35 provides a carbon fiber derived from the fiber of Embodiment 24.

Embodiment 36 provides the carbon fiber of Embodiment 35, wherein the carbon fiber has a diameter of about 1-300 μm.

Embodiment 37 provides the carbon fiber of any one of Embodiments 35-36, comprising pores occupying about 0.01-50% of the volume of the carbon fiber.

Embodiment 38 provides the carbon fiber of any one of Embodiments 35-37, comprising an average surface area of about 300-700 $m^2$/g, as determined using BET.

Embodiment 39 provides the carbon fiber of any one of Embodiments 35-38, comprising an average pore volume of about 0.100-0.500 cm$^3$/g, as determined using BET.

Embodiment 40 provides the carbon fiber of any one of Embodiments 35-39, comprising pores having an approximate shape of a cylinder.

Embodiment 41 provides carbon fibers made by a method comprising: spinning fibers from the composition of any one of Embodiments 1-23; heating the spun fibers to obtain carbon fibers.

Embodiment 42 provides a process comprising: thermally treating the fiber of any one of Embodiments 24-34 to yield a carbon fiber.

Embodiment 43 provides a method of making spun fibers, comprising: spinning fibers from the composition of any one of Embodiments 1-23, to give spun fibers.

Embodiment 44 provides the method of Embodiment 43, wherein spinning fibers comprises extruding the composition through a die and continuously spooling the extruded fiber.

Embodiment 45 provides a method of making carbon fibers, comprising the method of any one of Embodiments 43-44, further comprising: heating the spun fibers to obtain carbon fibers.

Embodiment 46 provides the method of Embodiment 45, wherein the method of making carbon fibers further comprises thermostabilizing the spun fibers prior to the heating step.

Embodiment 47 provides the method of Embodiment 46, wherein thermostabilizing the spun fibers comprising heating to about 100-120° C. with a heating rate of about 0.1-5° C./min.

Embodiment 48 provides the method of any one of Embodiments 46-47, wherein thermostabilizing the spun fibers comprises heating to a temperature of about 120-500° C. with a heating rate of about 0.01-10° C./min.

Embodiment 49 provides the method of Embodiment 48, wherein the temperature of about 120-500° C. is maintained in an oxygen atmosphere for about 1 h-30 h.

Embodiment 50 provides the method of any one of Embodiments 45-49, wherein heating the spun fibers to obtain carbon fibers comprises heating to a temperature of about 500-3000° C. with a heating rate of about 10-3000° C./h.

Embodiment 51 provides the method of Embodiment 50, wherein the temperature of about 500-3000° C. is maintained in an oxygen atmosphere for about 1 min-30 h.

Embodiment 52 provides a carbon fiber, comprising: an average surface area of about 300-700 m$^2$/g; and an average pore volume of about 0.100-0.500 cm$^3$/g.

Embodiment 53 provides the apparatus or method of any one or any combination of Embodiments 1-52 optionally configured such that all elements or options recited are available to use or select from.

What is claimed is:

1. A method of making carbon fibers, the method comprising:
spinning fibers comprising an esterified lignin composition, to give spun fibers, the esterified lignin composition comprising
lignin comprising at least one esterified —OH group, wherein the esterified —OH group has the structure —OC(O)R, wherein each R is independently a $C_1$-$C_{30}$ hydrocarbyl group, and
poly(lactic acid); and
heating the spun fibers to obtain the carbon fibers.

2. The method of claim 1, wherein heating the spun fibers to obtain carbon fibers comprises heating to a temperature of about 500° C. to about 3000° C. with a heating rate of about 10° C./h to about 3000° C./h, wherein the temperature of about 500 to about 3000° C. is maintained in an oxygen atmosphere for about 1 min to about 30 h.

3. The method of claim 1, wherein spinning fibers comprises extruding the esterified lignin composition through a die and continuously spooling the extruded fiber.

4. The method of claim 1, wherein the method of making carbon fibers further comprises thermostabilizing the spun fibers prior to the heating step.

5. The method of claim 4, wherein thermostabilizing the spun fibers comprises at least one of a) heating to a temperature of about 120° C. to about 500° C. with a heating rate of about 0.01° C./min to about 10° C./min, and b) heating to about 100° C. to about 120° C. with a heating rate of about 0.1° C./min to about 5° C./min.

6. The method of claim 1, wherein in the esterified lignin composition the weight ratio of the esterified lignin to the poly(lactic acid) is about 1:1 to about 9:1.

7. The method of claim 1, wherein in the esterified lignin composition the weight ratio of the esterified lignin to the poly(lactic acid) is about 3:1.

8. The method of claim 1, wherein in the esterified lignin composition about 50 mol % to about 100 mol % of the —OH groups on the lignin are esterified.

9. The method of claim 1, wherein in the esterified lignin composition each R group is independently a $C_1$-$C_{10}$ alkyl group.

10. The method of claim 1, wherein each R group is a propyl group.

11. The method of claim 1, wherein the esterified lignin composition has a glass transition temperature of about 40° C. to about 70° C. and a melting temperature of about 150° C. to about 170° C.

12. The method of claim 1, wherein the fibers comprising the esterified lignin composition each independently have a diameter of about 1 μm to about 300 μm.

13. The method of claim 1, wherein the fibers comprising the esterified lignin each comprise a plurality of smaller fibers within a larger fiber, wherein each of the plurality of smaller fibers independently have a diameter that is about 1/10 to about 1/1,000,000 the diameter of the larger fiber.

14. The method of claim 13, wherein each of the plurality of smaller fibers independently has a diameter of less than about 1-2 μm.

15. The method of claim 1, wherein the carbon fibers have a diameter of about 1 μm to about 300 μm.

16. The method of claim 1, wherein the carbon fibers comprise pores occupying about 0.01% to about 50% of the volume of the carbon fibers, wherein the carbon fibers have an average pore volume of about 0.100 cm$^3$/g to about 0.500 cm$^3$/g.

17. The method of claim 1, wherein the carbon fibers have an average surface area of about 300 m$^2$/g to about 700 m$^2$/g, as determined using BET.

18. The method of claim 1, wherein the carbon fibers comprise:
an average surface area of about 300 m$^2$/g to about 700 m$^2$/g; and
an average pore volume of about 0.100 cm$^3$/g to about 0.500 cm$^3$/g.

19. A method of making carbon fibers, the method comprising:
spinning fibers comprising an esterified lignin composition, to give spun fibers, the esterified lignin composition comprising lignin comprising at least one esterified —OH group, wherein the esterified —OH group has the structure —OC(O)R, wherein each R is independently a $C_1$-$C_{30}$ hydrocarbyl group, and poly(lactic acid); and heating the spun fibers to obtain the carbon fibers, wherein the carbon fibers comprise an average surface area of about 300 $m^2$/g to about 700 $m^2$/g; and an average pore volume of about 0.100 $cm^3$/g to about 0.500 $cm^3$/g.

20. A method of making carbon fibers, the method comprising:

spinning fibers comprising an esterified lignin composition, to give spun fibers, the esterified lignin composition comprising lignin comprising at least one esterified —OH group, wherein the esterified —OH group has the structure —OC(O)R, wherein each R is independently a $C_1$-$C_{10}$ alkyl group, and poly(lactic acid), wherein the weight ratio of the esterified lignin to the poly(lactic acid) is about 3:1; and heating the spun fibers to obtain the carbon fibers.

* * * * *